(12) United States Patent
Mochizuki et al.

(10) Patent No.: US 9,367,727 B2
(45) Date of Patent: Jun. 14, 2016

(54) INFORMATION PROCESSING APPARATUS AND INFORMATION PROCESSING METHOD

(71) Applicant: SONY CORPORATION, Tokyo (JP)

(72) Inventors: Daisuke Mochizuki, Chiba (JP); Tatsuhito Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 197 days.

(21) Appl. No.: 14/045,040

(22) Filed: Oct. 3, 2013

(65) Prior Publication Data

US 2014/0119614 A1 May 1, 2014

(30) Foreign Application Priority Data

Oct. 30, 2012 (JP) ................................. 2012-238768

(51) Int. Cl.
*G06K 9/00* (2006.01)
*G09B 19/00* (2006.01)

(52) U.S. Cl.
CPC .............. *G06K 9/00* (2013.01); *G06K 2209/27* (2013.01)

(58) Field of Classification Search
USPC ......... 382/100, 103, 106, 110, 113, 140, 143, 382/154–155, 162, 168, 173, 181, 199, 209, 382/219, 222, 232, 254, 274, 276, 282–291, 382/305, 312; 600/316; 434/127
See application file for complete search history.

(56) References Cited

U.S. PATENT DOCUMENTS

| | | | | |
|---|---|---|---|---|
| 2003/0059747 A1* | 3/2003 | Yoshida | ................ | G06Q 10/10 434/127 |
| 2003/0208113 A1* | 11/2003 | Mault | ................ | A61B 5/14532 600/316 |
| 2009/0298021 A1* | 12/2009 | Black | ................ | G06F 19/3475 434/127 |
| 2010/0003647 A1* | 1/2010 | Brown | ............... | G09B 19/0092 434/127 |
| 2012/0094258 A1* | 4/2012 | Langheier | ........... | G06F 19/3406 434/127 |
| 2013/0157232 A1* | 6/2013 | Ehrenkranz | ........ | G01G 19/4146 434/127 |

FOREIGN PATENT DOCUMENTS

JP          2011-028382          2/2011

* cited by examiner

*Primary Examiner* — Seyed Azarian
(74) *Attorney, Agent, or Firm* — Paratus Law Group, PLLC

(57) ABSTRACT

There is provided an information processing apparatus including an image acquisition unit configured to acquire a dish image obtained by shooting a single or multiple dishes, and a first dish recognition unit configured to recognize the single or multiple dishes included in the dish image with reference to dish data selected, from dish data registered in advance, based on a condition regarding at least one of a person relating to the dish image, a shooting environment of the dish image, a shooting place of the dish image, and a shooting time of the dish image.

20 Claims, 17 Drawing Sheets

FIG.3A

| | Data | Date | Time | Place | By | With |
|---|---|---|---|---|---|---|
| 1030a | 001.jpg | 2012/10/12 (Fri) | 12:10 | Office | John | Paul George |
| 1030b | 002.jpg | 2012/10/12 (Fri) | 19:30 | Home | John | Julia |
| 1030c | 003.jpg | 2012/10/13 (Sat) | 13:00 | Restaurant | John | Richard |
| | ... | ... | ... | ... | ... | ... |

FIG. 3B

| DISH | Data | Whose data? | When? | Where? | With whom? |
|---|---|---|---|---|---|
| RICE | P001.jpg | John | Lunch (Weekday) | Office | Colleague (Paul, George, ...) |
| SALAD | P002.jpg | John | Lunch (Weekday) | Office | Colleague (Paul, George, ...) |
| ... | ... | ... | ... | ... | ... |
| RICE | P011.jpg | John | Dinner | Home | Family (Julia) |
| ... | ... | ... | ... | ... | ... |
| PIZZA | P021.jpg | John | Lunch (Weekend) | Restaurant | Friend (Richard) |

| | Data | Date | Time | Shutter speed | Flash? | ... |
|---|---|---|---|---|---|---|
| 1032a | 001.jpg | 2012/10/12 (Fri) | 12:10 | 1/240 | No | ... |
| 1032b | 002.jpg | 2012/10/12 (Fri) | 19:30 | 1/120 | Yes | ... |
| 1032c | 003.jpg | 2012/10/13 (Sat) | 13:00 | 1/60 | Yes | ... |
| | ... | ... | ... | ... | ... | ... |

FIG.5B

| DISH | Data | Whose data? | Shutter speed | Flash? | ... |
|---|---|---|---|---|---|
| RICE | P001.jpg | John | 1/250 | No | ... |
| SALAD | P002.jpg | John | 1/250 | No | ... |
| ... | ... | ... | ... | ... | ... |
| RICE | P011.jpg | John | 1/125 | Yes | ... |
| ... | ... | ... | ... | ... | ... |
| PIZZA | P021.jpg | John | 1/60 | Yes | ... |

| | DISH | Source | Area |
|---|---|---|---|
| 2020a | RICE | S001.jpg | x=125, y=64 width=20, height=20 |
| 2020b | SALAD | S001.jpg | x=243, y=126 width=20, height=20 |
| | ... | ... | ... |
| 2020p | RICE | S002.jpg | x=155, y=173 width=20, height=20 |
| | ... | ... | ... |
| 2020q | PIZZA | S003.jpg | x=98, y=24 width=20, height=20 |

FIG.10

| DISH | ... | Last matched | Match count | Last used | Usage count |
|---|---|---|---|---|---|
| RICE | ... | 2012/10/11 | 125 | 2012/10/11 | 130 |
| SALAD | ... | 2011/08/20 | 3 | 2012/10/11 | 130 |
| ... | ... | ... | ... | ... | ... |
| RICE | ... | 2012/03/10 | 0 | 2012/10/11 | 86 |
| ... | ... | ... | ... | ... | ... |
| PIZZA | ... | 2012/05/25 | 1 | 2012/05/25 | 1 |

3020a
3020b
3020p
3020q

INFORMATION PROCESSING APPARATUS AND INFORMATION PROCESSING METHOD

CROSS REFERENCE TO RELATED APPLICATIONS

This application claims the benefit of Japanese Priority Patent Application JP 2012-238768 filed Oct. 30, 2012, the entire contents of which are incorporated herein by reference.

BACKGROUND

The present disclosure relates to an information processing apparatus and an information processing method.

Such a technique is gaining widespread use that electrically records, for daily dietary management and the like, information regarding meals that a user takes and, for example, calculates and provides nutrition and calories to the user as information. In such a technique, a user generally inputs information regarding a meal by use of a terminal apparatus that the user uses, and transmits the information to a server. However, as a method for simplifying input of information, such a technique is proposed that uses an image shot by a user as inputs of information regarding a meal.

For example, JP 2011-28382A describes a technique for detecting an area from an image of a meal shot by a user, for each dish (such as rice, miso soup, stir-fried vegetables, and coffee), and recognizing through template matching and the like what each dish shown in the area is. As a template used for recognition, the following two images can be used: an image of a dish that a user has previously taken, and an image of a meal that is registered as a standard.

If an image of a meal that a user has previously taken is used as a template for recognition in this way, it becomes possible to accurately recognize dishes that the user takes on a daily basis. Use of an image of a meal that is registered as a standard with the above-described image allows the user to recognize even dishes that the user does not take on a daily basis.

SUMMARY

The technique described in JP 2011-28382A allows more dishes to be accurately recognized with increase in images of dishes registered as templates. However, the more images (that are candidates for dishes shown in an image) are targets for matching, the heavier loads are placed in performing a process such as template matching used for dish recognition. That is, it is difficult that a technique as described in JP 2011-28382A recognizes a dish more easily and decreases processing loads at the same time.

The present disclosure therefore proposes an information processing apparatus and an information processing method that are novel and improved, and can maintain the accuracy of recognizing a dish from an image and decrease processing loads by limiting data that is referred to in recognition.

According to an embodiment of the present disclosure, there is provided an information processing apparatus including an image acquisition unit configured to acquire a dish image obtained by shooting a single or multiple dishes, and a first dish recognition unit configured to recognize the single or multiple dishes included in the dish image with reference to dish data selected, from dish data registered in advance, based on a condition regarding at least one of a person relating to the dish image, a shooting environment of the dish image, a shooting place of the dish image, and a shooting time of the dish image.

According to another embodiment of the present disclosure, there is provided an information processing apparatus including acquiring a dish image obtained by shooting a single or multiple dishes, and recognizing the single or multiple dishes included in the dish image with reference to dish data selected, from dish data registered in advance, based on a condition regarding at least one of a person relating to the dish image, a shooting environment of the dish image, a shooting place of the dish image, and a shooting time of the dish image.

It is selected on the basis of a person relating to a dish image, a shooting environment of the dish image, a shooting place of the dish image, a shooting time of the dish image, or the like which dish data should be referred to. It is hereby possible to selectively refer to dish data relating to the dish image to perform dish recognition. It is possible to maintain the accuracy of dish recognition and decrease processing loads by selectively referring to dish data that is estimated to be useful for dish recognition.

According to one or more of embodiments of the present disclosure, it is possible to maintain the accuracy of recognizing a dish from an image, and decrease processing loads by limiting data that is referred to in recognition.

BRIEF DESCRIPTION OF THE DRAWINGS

FIG. 3A is a diagram illustrating a first example of metadata of a dish image in the first embodiment of the present disclosure;

FIG. 3B is a diagram illustrating a first example of information associated with dish data in the first embodiment of the present disclosure;

FIG. 5A is a diagram illustrating a second example of metadata of a dish image in the first embodiment of the present disclosure;

FIG. 5B is a diagram illustrating a second example of information associated with dish data in the first embodiment of the present disclosure;

FIG. 7 is a diagram illustrating an example of information associated with dish data in the second embodiment of the present disclosure;

FIG. 10 is a diagram illustrating an example of information associated with dish data in the third embodiment of the present disclosure;

DETAILED DESCRIPTION OF THE EMBODIMENT(S)

Figure 1:
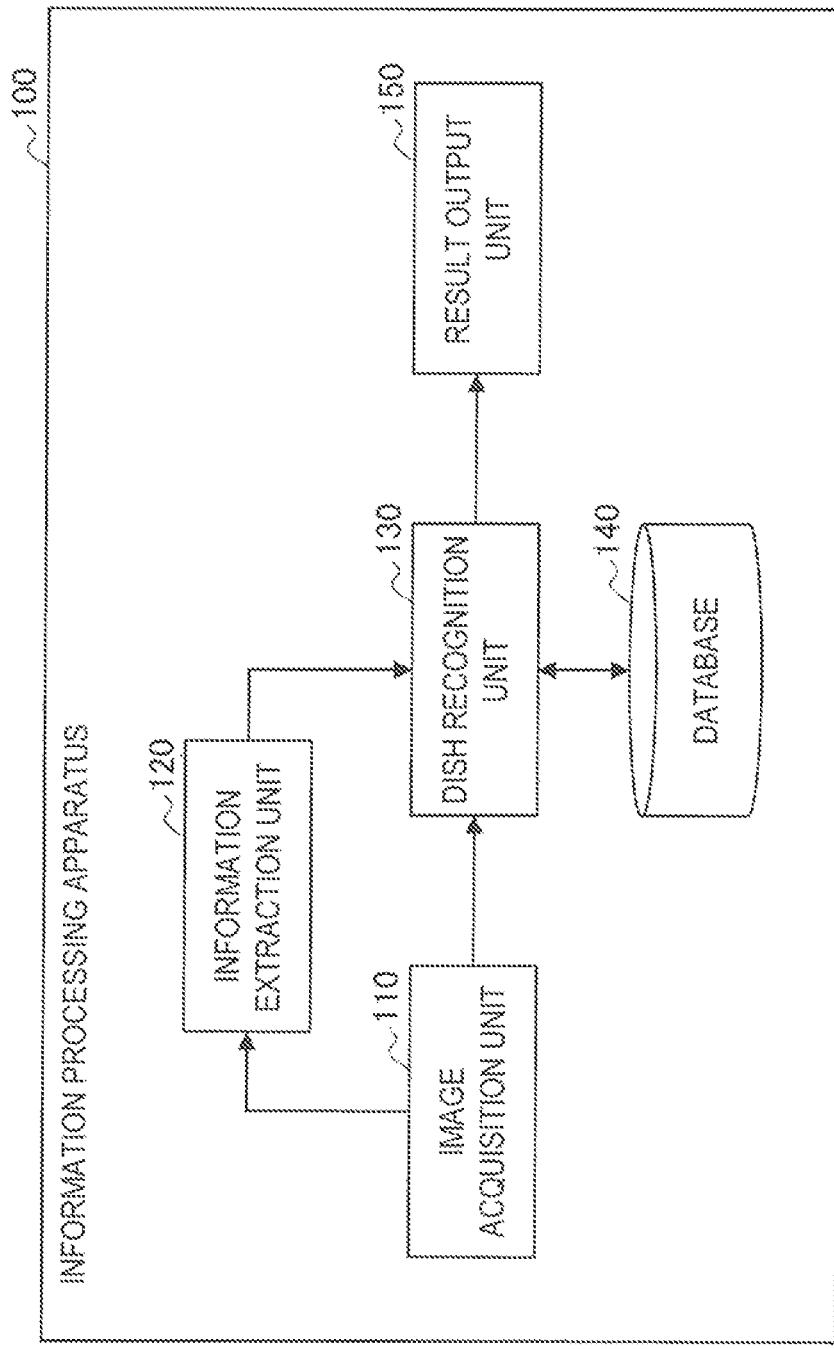
FIG. 1 is a block diagram illustrating a schematic functional configuration of an information processing apparatus according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. First Embodiment
1-1. Functional Configuration
1-2. Overview of Dish Recognition Process
1-3. First Example of Dish Recognition Process
1-4. Second Example of Dish Recognition Process
2. Second Embodiment
3. Third Embodiment
4. Fourth Embodiment
5. Fifth Embodiment
6. Sixth Embodiment
7. Hardware Configuration
8. Supplement

1. First Embodiment

1-1. Functional Configuration

FIG. 1 is a block diagram illustrating a schematic functional configuration of an information processing apparatus according to a first embodiment of the present disclosure. With reference to FIG. 1, an information processing apparatus 100 includes an image acquisition unit 110, an information extraction unit 120, a dish recognition unit 130, a database 140, and a result output unit 150. The information processing apparatus 100 performs a process of acquiring a dish image as an input, and recognizing a dish included in the dish image.

The information processing apparatus 100 may be, for example, a terminal apparatus that is used by a user, or a server that communicates with a terminal apparatus which is a client and provides a service to a user. The terminal apparatus may be, for example, a personal computer (PC) such as a tablet PC, a notebook PC, and a desktop PC, a mobile phone (smartphone), a media player, or a game device. A function of the server may be realized, for example, by a single server apparatus, or multiple server apparatuses that are connected through a wired or wireless network. The terminal apparatus and the server apparatus may be realized, for example, by using a hardware configuration of the information processing apparatus, which will be described below.

The image acquisition unit 110 acquires a dish image obtained by shooting a single or multiple dishes. For example, if the information processing apparatus 100 is a terminal apparatus, the image acquisition unit 110 is realized as a camera (imaging unit) that shoots a dish image. Alternatively, the image acquisition unit 110 may be realized as a communication device that receives a dish image shot by an apparatus having a camera installed therein. In that case, the communication apparatus receives a dish image from another apparatus that is connected, for example, through a home network and owned by a user. Meanwhile, if the information processing apparatus 100 is a server, the image acquisition unit 110 is realized, for example, as a communication device that receives a dish image from a client terminal apparatus connected through a network.

The dish image means an image obtained by shooting, for example, a meal that a user takes. For example, a light meal includes a single dish in a dish image. A usual meal includes multiple dishes such as a staple food, a main dish, and a side dish in a dish image. The information processing apparatus 100 recognizes a dish included in a dish image, which is namely a dish included in a meal which a user takes, through a process of the dish recognition unit 130, which will be described below.

A dish image entails metadata in the present embodiment. The metadata includes information indicating, for example, a person relating to the dish image, a shooting environment of the dish image, a shooting place of the dish image, or a shooting time of the dish image. Such kinds of information may be automatically set, for example, by a terminal apparatus that shoots the dish image. Alternatively, the information may be set in accordance with an input operation of a user. For example, the metadata may also be recorded in accordance with a compatible format such as the Exchangeable image file format (Exif). Alternatively, the metadata may be recorded in a format unique to an application that provides analysis of the dish image.

The information extraction unit 120 extracts information regarding at least one of the person relating to the dish image, the shooting environment of the dish image, the shooting place of the dish image, and the shooting time of the dish image from the metadata of the dish image acquired by the image acquisition unit 110, and provides the extracted information to the dish recognition unit 130. The information extraction unit 120 is realized by a processor such as a central processing unit (CPU) operating in accordance with a program stored in a memory.

The dish recognition unit 130 recognizes a single or multiple dish included in the dish image with reference to dish data selected, from dish data registered in advance, on the basis of a condition regarding at least one of the person relating to the dish image, the shooting environment of the dish image, the shooting place of the dish image, and the shooting time of the dish image. Information used for setting the condition is extracted from the metadata of the dish image by the information extraction unit 120 in the present embodiment. The dish data is stored in the database 140. The dish data is data corresponding to each dish that may be included in the dish image. Processing loads in dish recognition are decreased by selecting dish data that is referred to by the dish recognition unit 130 in a process of dish recognition on the basis of a predetermined condition. Additionally, a detailed process of recognizing a dish with reference to dish data will be described below. The dish recognition unit 130 is also realized by a processor such as a CPU operating in accordance with a program stored in a memory.

The "person relating to a dish image" herein includes, for example, a user who shoots the dish image, and a person who is with the user when the dish image is shot, which namely means a person who takes a meal shown in the dish image with the user. The "shooting environment of a dish image"

includes, for example, luminous intensity in the neighborhood at the time of shooting the dish image, colors of the background table and a tray, and conditions of illumination (that mean whether the illumination is natural light, light of a fluorescent lamp, light of an electric bulb, or the like). The "shooting place of a dish image" includes, for example, coordinates (latitude and longitude) of a place in which the dish image is shot, and a specific name of the place (such as an office, a home, and a restaurant). Additionally, the shooting place of a dish image does not necessarily have to be identified in the form of a point, but may be identified, for example, in the form of an area having a predetermined size, an administrative district, and a name of the place. The "shooting time of a dish image" means a time at which the dish image is shot. The time may include a date. Dish data that is referred to by the dish recognition unit 130 is selected in accordance with a condition based on subsidiary information of the dish image as described above in the present embodiment.

The database 140 stores dish data that is referred to in a process of dish recognition performed by the dish recognition unit 130. The dish data is stored in association with information such as the person, the shooting situation, the shooting place, and the shooting time. The dish recognition unit 130 selects dish data that is referred to in a process of dish recognition, on the basis of the above-described information associated with the dish data, and a condition that is set by the information extraction unit 120 on the basis of information extracted from metadata of the dish image. The database 140 is realized, for example, by a storage device of the information processing apparatus 100. Alternatively, the database 140 is realized by an external storage device of the information processing apparatus 100. The dish recognition unit 130 may access the database 140 via a network.

The result output unit 150 outputs information regarding a result of dish recognition performed by the dish recognition unit 130. For example, if the information processing apparatus 100 is a terminal apparatus, the result output unit 150 may be realized as an output device such as a display and a speaker that outputs the information regarding the recognition result in the form of an image or sounds. Alternatively, the result output unit 150 may be realized as a communication device that transmits the information regarding the dish recognition result to another apparatus. If the information processing apparatus 100 is a server, the result output unit 150 outputs the information regarding the dish recognition result to, for example, a client terminal apparatus. The result output unit 150 may output the information regarding the dish recognition result to, for example, an apparatus that outputs information to a user, or an apparatus that uses the dish recognition result for further analysis and data accumulation.

Information such as nutrition and calories regarding each dish has been already provided on the basis of a material for the dish and a method for cooking the dish. Such kinds of information can be stored in the database 140, and also be acquired from an appropriate service on a network. Accordingly, once a dish included in a dish image is recognized, it is possible to calculate, on the basis of information of the recognized dish such as nutrition and calories, the nutrition and the calories of the meal that a user takes, and provide the information to the user via the result output unit 150. Such kinds of information regarding the recognition result may be provided to a user each time the user takes a meal. Alternatively, the information regarding the recognition result may be accumulated as a log, further analyzed as necessary, and provided to the user.

1-2. Overview of Dish Recognition Process

Figure 2:
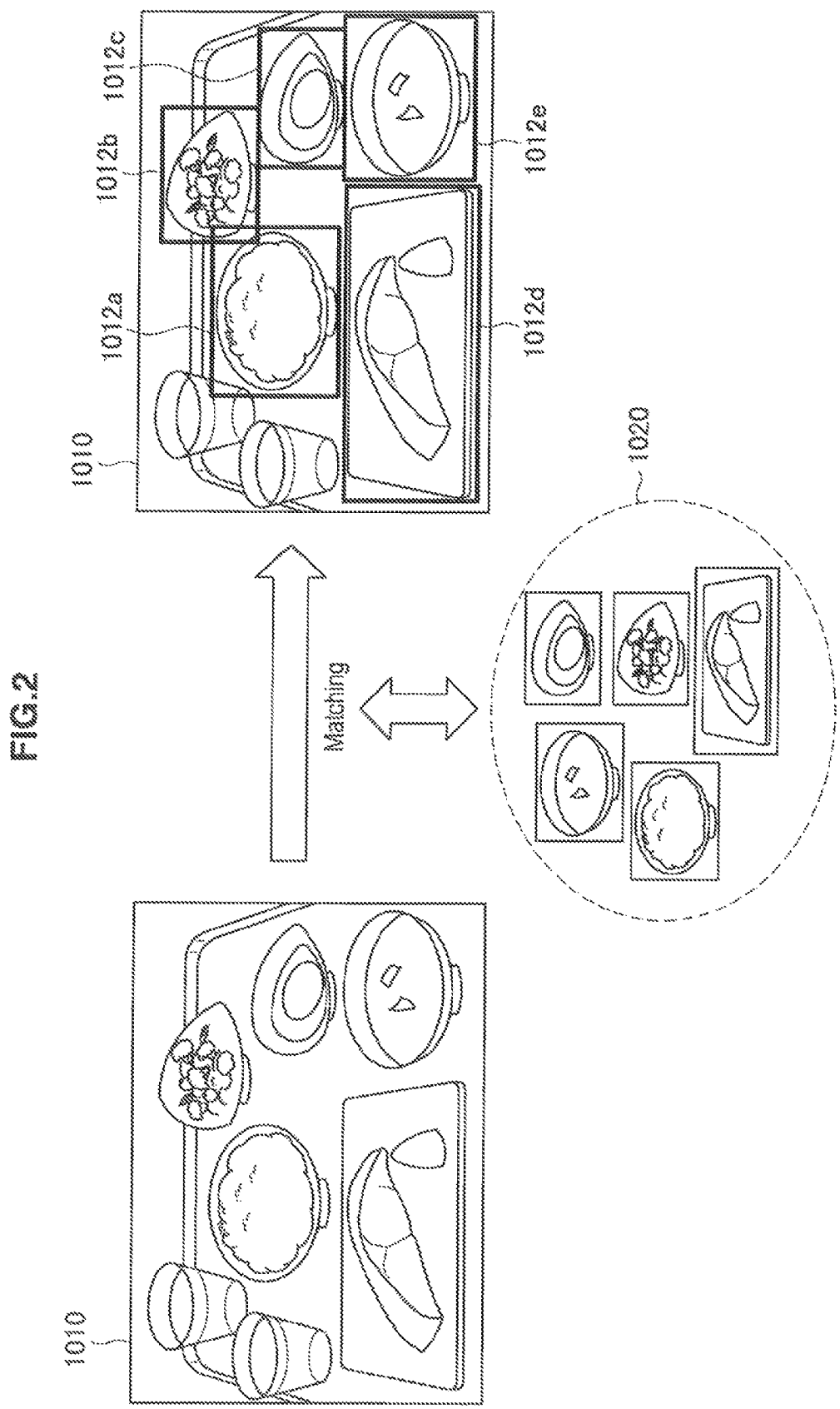
FIG. 2 is a diagram for schematically describing a dish recognition process in the first embodiment of the present disclosure.

FIG. 2 is a diagram for schematically describing a dish recognition process according to the first embodiment of the present disclosure. With reference to FIG. 2, the dish recognition unit 130 of the information processing apparatus 100 recognizes dishes 1012 included in a dish image 1010 by matching the dish image 1010 with dish data 1020. In the illustrated example, rice 1012a, a salad 1012b, an egg 1012c, a fish 1012d, and miso soup 1012e are recognized as the dishes 1012.

The dish image 1010 is an image obtained by shooting, for example, a meal that a user takes, and acquired by the image acquisition unit 110. Meanwhile, the dish data 1020 is data corresponding to each dish that may be included in the dish image 1010, registered in advance, and stored in the database 140. The dish recognition unit 130 matches the dish image 1010 with the dish data 1020. For example, if the dish data 1020 is data of an image showing each dish, the dish recognition unit 130 performs matching such as template matching on the images. Various known techniques as described in, for example, JP 2011-28382A can be used for matching.

As an example, the dish image 1010 herein matches with the dish data 1020 in a process performed by the dish recognition unit 130. However, the dish recognition unit 130 may recognize the dishes 1012 included in the dish image 1010 through a process other than matching. For example, the dish recognition unit 130 may use the selected dish data 1020 as a learning sample to recognize the dishes 1012 through object recognition.

The above-described processes of matching and object recognition both place heavy loads. Thus, heavier loads are placed in a process performed by the dish recognition unit 130 with increase in the volume of dish data 1020 registered with the database 140, for example. To the contrary, the accuracy of dish recognition performed by the dish recognition unit 130 is reduced more with decrease in the registered volume of dish data 1020 because fewer dishes can be recognized.

In the present embodiment, the dish recognition unit 130 therefore selects dish data 1020 that is referred to in a process of dish recognition on the basis of a condition regarding a person relating to the dish image 1010, a shooting situation of the dish image 1010, a shooting place of the dish image 1010, a shooting time of the dish image 1010, or the like. It is hereby possible to maintain the accuracy of dish recognition performed by the dish recognition unit 130, and decrease processing loads by limiting the dish data 1020 that is referred to.

The process of dish recognition in the present embodiment will be further described below with reference to specific examples of a condition indicated by metadata of the dish image 1010, and information associated with the dish data 1020.

1-3. First Example of Dish Recognition Process

FIGS. 3A and 3B are diagrams illustrating a first example of metadata of a dish image and information that is associated with dish data in the first embodiment of the present disclosure, respectively. FIG. 3A illustrates pieces of metadata 1030a to 1030c as examples of metadata 1030 of a dish image. FIG. 3B illustrates pieces of dish data 1020a, 1020b, 1020p, and 1020q as examples of dish data 1020.

The metadata 1030 illustrated in FIG. 3A corresponds to dish images (001.jpg to 003.jpg). Additionally, the dish image is not limited to an image in the jpg format. In the first example, a date (Date), a time (Time), a place (Place), a person who shoots a dish (By), and a person with the person who shoots the dish (With) are set as items of the metadata 1030. For example, the metadata 1030a of the dish image 001.jpg indicates that the dish image 001.jpg is shot by John at 12:10 on Friday, Oct. 12, 2012 in an office with Paul and George.

Such kinds of metadata 1030 may be set on the basis of information automatically detected by a terminal apparatus that shoots the dish image. For example, position information of a shooting place that is acquired by using a shooting date, a shooting time, a global positioning system (GPS), and the like is generally known as information that is added to an image as metadata by using a compatible format such as the Exif. Furthermore, information regarding a user who shoots the dish image and another person with the user when the dish image is shot can be automatically added to the image as metadata on the basis of, for example, user information registered with the apparatus, and position information provided from a terminal apparatus held by the other person.

Alternatively, the metadata 1030 may be set in accordance with a shooting time of the dish image or a later input operation of the user. In that case, the user sets metadata through an input operation such as so-called tagging with respect to, for example, a shooting place of the dish image, the user who shoots the dish image, and a person who is with the user when the dish image is shot. The metadata 1030 may include both an item that is set through an input operation of the user as described above and an item that is automatically detected. Alternatively, the metadata 1030 may include any one of the items.

Additionally, information of each item that is included in the metadata 1030 has been specifically shown for convenience of explanation, which does not intend to limit a form of metadata. For example, time information may be recorded along with a date, position information may be recorded in the form of coordinates (latitude and longitude), and a person who shoots an image and a person who is with the person shooting the image may be recorded in the form of user ID. The metadata 1030 does not have to include all the items shown in the figure, and may include at least one of the items.

The dish data 1020 illustrated in FIG. 3B is recorded for each dish. In the illustrated example, the dish data 1020 corresponds to pieces of dish image data (P001.jpg, P002.jpg, P011.jpg, and P021.jpg). Additionally, the dish image data is not limited to image data in the jpg format. In the first example, the dish data 1020 is associated with information such as a person who owns the data (Whose data?), a time zone in which a dish is taken (When?), a place in which the dish is taken (Where?), and a person who takes the dish together (With whom?). For example, the dish data 1020a indicating a dish, "rice," is associated with information indicating that John has the dish data 1020a, and "rice" is a dish taken in an office as a lunch on a weekday with coworkers (such as Paul and George).

The dish data 1020 does not necessarily have a one-to-one correspondence to the dishes. That is, multiple pieces of dish data 1020 may be set with respect to the same dish. For example, the dish indicated by the dish data 1020a means not just "rice," but "rice taken as a lunch in an office on a weekday with coworkers." In addition, there may be dish data 1020p regarding "rice" indicating "rice taken as a dinner on a weekend at home with a family." This is because the dish images may have different characteristics due to, for example, time zones for meals and another situation, though both of the images include the same dishes. For example, a bowl for "rice" taken as a lunch on a weekday in a cafeteria of an office has a different shape and a different color from a bowl for "rice" taken as a dinner on a weekend, and luminous intensity in the neighborhood is also different. Consequently, the dish images have different characteristics. Thus, it is preferable to prepare different kinds of dish data 1020 for the two types of "rice," and recognize that both of the dish images include "rice."

Such kinds of dish data 1020 may be registered through an explicit input operation of a user. For example, a user manually inputs a dish area included in a shot dish image, and a dish included in the area. The dish data 1020 may be registered on the basis thereof. In that case, information associated with the dish data 1020 may be set on the basis of information regarding, for example, a shooting date and time and a shooting place of the original dish image. Alternatively, the dish data 1020 may be distributed to a user who satisfies a predetermined condition. For example, the dish data 1020 regarding dishes on a menu of a cafeteria of an office may be distributed to a worker in the office, or the dish data 1020 regarding dishes on a menu of a restaurant may be distributed to a user who has been registered as a member for the restaurant.

Additionally, each item included in the dish data 1020 has also been specifically shown in the figure for convenience of explanation, which does not intend to limit the form of the dish data. For example, position information may be recorded in a range specified by coordinates (latitude and longitude), or a person may be recorded in the form of user ID. The dish data 1020 does not have to include all the information shown in the figure, and may include at least one piece of information. However, the metadata 1030 and the dish data 1020 include at least one corresponding piece of information. For example, if the metadata 1030 includes only information regarding a date (Date) and a time (Time), the dish data 1020 is associated with at least information regarding a time zone in which the dish is taken (When?). For example, if the dish data 1020 is associated with only information regarding a place in which the dish is taken (Where?), the metadata 1030 includes at least information regarding a place (Place).

Next, with reference to a flowchart illustrated in FIG. 4, an example of a dish recognition process using the metadata 1030 and the dish data 1020, as described above, will be described.

Figure 4:
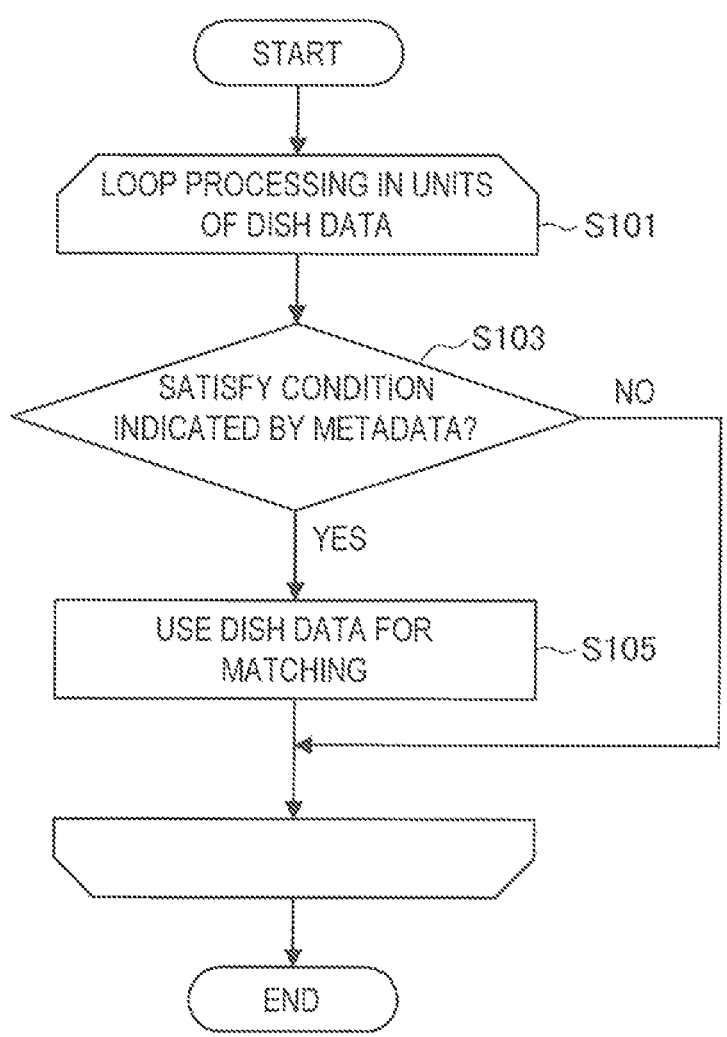
FIG. 4 is a flowchart illustrating an example of a dish recognition process in the first embodiment of the present disclosure.

FIG. 4 is a flowchart illustrating an example of a dish recognition process in the first embodiment of the present disclosure. In the illustrated example, the dish recognition unit 130 performs loop processing in units of the dish data 1020 when recognizing a dish included in a dish image (step S101).

The dish recognition unit 130 determines whether the dish data 1020 satisfies a condition indicated by metadata of the dish image (step S103). If the dish data 1020 satisfies the condition (YES), the dish recognition unit 130 uses the dish data 1020 for matching with the dish image (step S105). To the contrary, if the dish data 1020 does not satisfy the condition (NO), the dish recognition unit 130 does not use the dish data 1020 for matching, but proceeds to process the next dish data 1020 (step S101).

The above-described process that is performed by using the metadata 1030 and the dish data 1020 illustrated in FIGS. 3A and 3B will be further described.

As an example, let us assume that the image acquisition unit 110 acquires the dish image (001.jpg) that entails the metadata 1030a. In that case, the metadata 1030a indicates conditions that the dish image 001.jpg is "shot by John" (person relating to the image) "around the noon on Friday (weekday)" (shooting time) "in an office" (shooting place) "with Paul and George." Accordingly, the dish recognition unit 130 selects, as dish data used for matching, the dish data 1020 registered in association with information that satisfies the conditions. Additionally, all the conditions do not have to be used for extraction of the dish data 1020. A part of the conditions, which means, for example, one or two of a shooting time, a shooting place, and a person relating to the image may be used.

The pieces of dish data 1020*a* and 1020*b* of the dish data 1020 are each associated with information indicating that a meal is taken "as a lunch on a weekday" "in an office" "with coworkers (including Paul and George)." Thus, such kinds of dish data satisfy the conditions indicated by the metadata 1030*a*. To the contrary, the pieces of dish data 1020*p* and 1020*q* do not satisfy the conditions indicated by the metadata 1030*a* because the pieces of data 1020*p* and 1020*q* indicate that a meal is taken "as a lunch on a weekend" or "at home."

Thus, determination in step S103 shows YES with respect to the pieces of dish data 1020*a* and 1020*b*, and NO with respect to the pieces of dish data 1020*p* and 1020*q*. Consequently, the pieces of dish data 1020*a* and 1020*b* are used for matching in step S105, while the pieces of dish data 1020*p* and 1020*q* are not used for matching.

As the associated information indicates, the pieces of dish data 1020*p* and 1020*q* are a piece of data indicating a meal taken as a dinner at home with a family and a piece of data indicating a meal taken as a lunch on a weekend in a restaurant with a friend, respectively. Thus, if the pieces of data are used for matching with the dish image 001.jpg (that is an image of a meal taken as a lunch on a weekday in an office with a coworker), there is little possibility that the pieces of data match with the dish image 001.jpg. It is possible to maintain the accuracy of recognition and decrease the processing loads by performing dish recognition with the dish data 1020 excluded from the reference targets.

In the illustrated examples, the pieces of dish data 1020*a*, 1020*b*, 1020*p*, and 1020*q* are all pieces of data regarding John. Accordingly, a condition of a person who shoots the dish image is not useful for selecting the dish data 1020. In another example, if the database 140 of the information processing apparatus 100, which is, for example, a server, stores data regarding multiple users, the dish recognition unit 130 may selectively refer to the dish data 1020 that is indicated as being data regarding a person who shoots the dish image indicated by the metadata 1030.

1-4. Second Example of Dish Recognition Process

FIGS. 5A and 5B are diagrams illustrating metadata of a dish image in the first embodiment of the present disclosure and a second example of information associated with dish data, respectively. FIG. 5A illustrates pieces of metadata 1032*a* to 1032*c* as examples of metadata 1032 of the dish images. FIG. 5B illustrates pieces of dish data 1022*a*, 1022*b*, 1022*p*, and 1022*q* as examples of dish data 1022.

The metadata 1032 illustrated in FIG. 5A corresponds to the dish images (001.jpg to 003.jpg). The dish image is not limited to an image in the jpg format. In the second example, for example, a date (Date), a time (Time), a shutter speed (Shutter Speed), and use of a flashlight (Flash?) are set as items of the metadata 1032. For example, the metadata 1032*a* of the dish image 001.jpg indicates that the dish image is shot at 12:10 on Friday, Oct. 12, 2012 at a shutter speed of $\frac{1}{240}$ seconds without a flashlight.

Such kinds of metadata 1032 may be set, for example, on the basis of information automatically detected by a terminal apparatus that shoots the dish image. An item that is included in the metadata 1032 and indicates a shooting environment of the dish image is generally recorded by using a compatible format such as the Exif. Thus, as an example, the information extraction unit 120 may extract, from the Exif data added to the dish image, information indicating a condition that is used for the dish recognition unit 130 to select dish data.

The dish data 1022 illustrated in FIG. 5B are set for each dish. In the illustrated example, the dish data 1022 corresponds to each piece of dish image data (P001.jpg, P002.jpg, P011.jpg, and P021.jpg). The dish image data is not limited to an image data in the jpg format. In the second example, the dish data 1022 is associated with information such as a person who owns the data (Whose data?), a shutter speed (Shutter Speed), and use of a flashlight (Flash?). For example, if the dish image data is an image that is cut away from a previous dish image, such a kind of information is set on the basis of information such as the Exif that indicates a shooting situation of the original image.

In the second example, the dish data 1022 does not necessarily have a one-to-one correspondence to dishes. That is, multiple pieces of dish data 1022 may be set with respect to the same dish. For example, the pieces of dish data 1022*a* and 1022*p* are both pieces of dish data regarding "rice." However, since the dish data 1022*a* is an image that is shot at a high shutter speed without a flashlight, the dish data 1022*a* is estimated, for example, to be cut away from an image shot in a light cafeteria of an office in a daytime. Meanwhile, since the dish data 1022*p* is an image shot at a low shutter speed with a flashlight, the dish data 1022*p* is estimated, for example, to be cut away from an image shot at night at a gloomy home. Thus, it is preferable to prepare different pieces of dish data 1022 for the two types of "rice," and recognize that the dish images including both the types include "rice."

By use of the metadata 1032 and the dish data 1022 illustrated in FIGS. 5A and 5B, execution of the process of dish recognition illustrated in FIG. 4 will be further described.

As an example, let us assume that the image acquisition unit 110 acquires the dish image (002.jpg) that entails the metadata 1032*b*. In that case, the metadata 1032*a* indicates that the dish image 002.jpg is shot at a shutter speed of $\frac{1}{120}$ seconds with a flashlight. Accordingly, the dish recognition unit 130 selects, as dish data used for matching, the dish data 1022, which is registered in association with information corresponding to the above-described conditions. Additionally, all of the conditions do not have to be used for extraction of the dish data 1022. A part of the conditions, which means, for example, any of a shutter speed and use of a flashlight may be used.

The dish data 1022*p* of the dish data 1022 is associated with information indicating that the dish data 1022*p* is shot at a shutter speed ($\frac{1}{125}$ seconds) approximating to the shutter speed ($\frac{1}{125}$ seconds) of the metadata 1032*b* with a flashlight. Thus, the dish data 1022*p* satisfies the conditions indicated by the metadata 1032*b*. To the contrary, the pieces of dish data 1022*a*, 1022*b*, and 1022*q* have a much higher shutter speed ($\frac{1}{250}$ seconds) or a much lower shutter speed ($\frac{1}{60}$ seconds) than the dish image, or are shot without a flashlight, which do not satisfy the conditions indicated by the metadata 1032*a*.

Thus, determination in step S103 shows YES with respect to the dish data 1022*p*, and NO with respect to the pieces of dish data 1022*a*, 1022*b*, and 1022*q*. Thus, the dish data 1022*p* is used for matching in step S105. The pieces of dish data 1022*a*, 1022*b*, and 1022*q* are not used for matching.

The pieces of dish data 1022*a* and 1022*b* are pieces of data of dishes that are taken in a very light environment, as indicated by the associated information. To the contrary, the dish data 1022*q* is a piece of data of a dish that is taken in a very dark environment. Thus, if the pieces of dish data are used for matching with the dish image 002.jpg (image shot in a gloomy environment), there is little possibility that the pieces of dish data match with the dish image 002.jpg. It is possible to maintain the accuracy of recognition and decrease processing loads by performing dish recognition with the dish data 1022 excluded from the reference targets.

As shown by the above-described example, a certain latitude may be allowed in determining whether the dish data 1022 satisfies the conditions indicated by the metadata 1032. In the above-described example, the metadata 1032b indicates that the dish image is shot at a shutter speed of $\frac{1}{120}$ seconds, and the shutter speed associated with the dish data 1022p is $\frac{1}{125}$ seconds. However, the dish data 1022p is treated as satisfying the condition indicated by the metadata 1032b.

2. Second Embodiment

Figure 6:
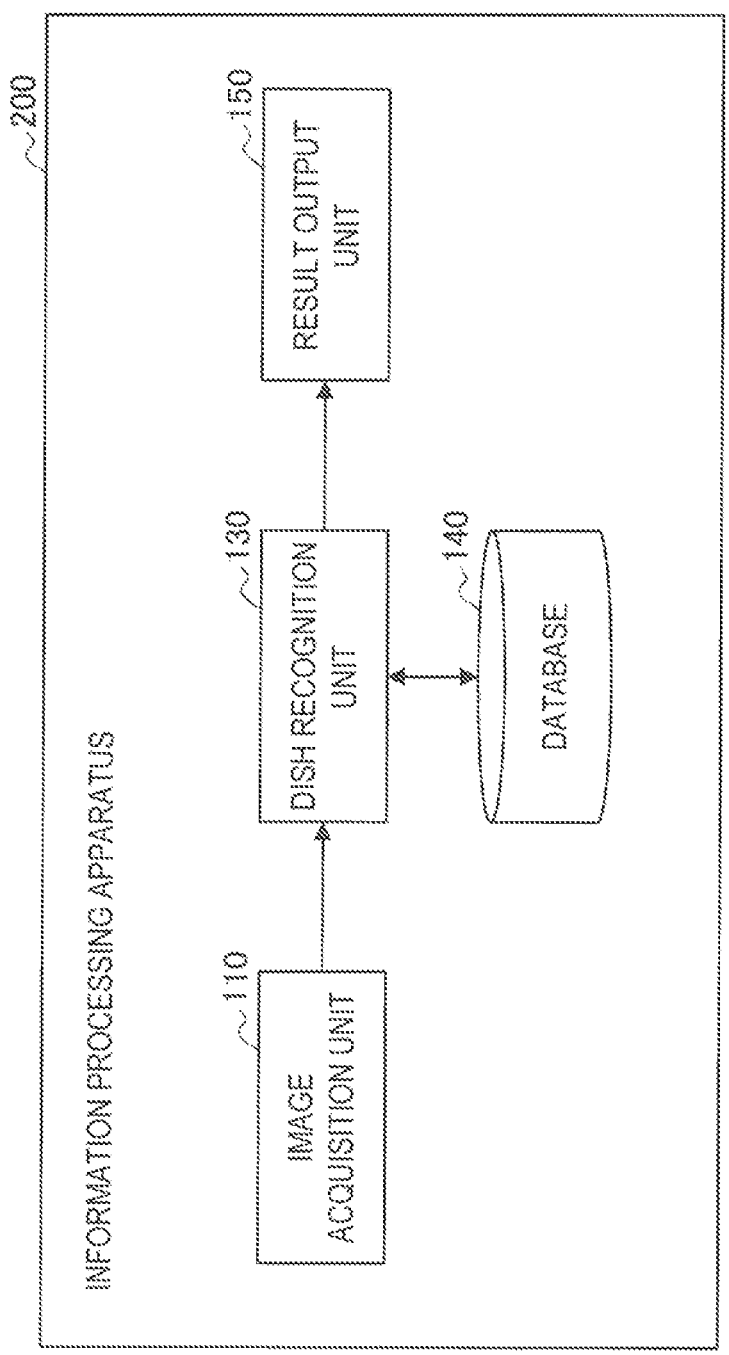
FIG. 6 is a block diagram illustrating a schematic functional configuration of an information processing apparatus according to a second embodiment of the present disclosure.

FIG. 6 is a block diagram illustrating a schematic functional configuration of an information processing apparatus according to a second embodiment of the present disclosure. With reference to FIG. 6, an information processing apparatus 200 includes an image acquisition unit 110, a dish recognition unit 130, a database 140, and a result output unit 150. Different from the information processing apparatus 100 according to the first embodiment, the information processing apparatus 200 does not include an information extraction unit 120. Thus, the present embodiment has a different process of extracting a condition for selecting dish data in the dish recognition unit 130, from the process in the first embodiment. The other configurations according to the present embodiment are substantially the same as the configurations of the first embodiment so that the repeated detailed description will be omitted.

In the present embodiment, the dish recognition unit 130 treats a characteristic of a whole dish image as information regarding at least one of a shooting environment of the dish image, a shooting place of the dish image, and a shooting time of the dish image. This is because images that have the same shooting situation, shooting place, or shooting time can possibly have the similar characteristics of the whole dish images. For example, dish images obtained by shooting meals at the same place (such as a cafeteria of an office, a home, and a restaurant) have, for example, the same tray, table, and tableware so that the dish images have the similar characteristics as the whole dish images.

Even if places are not identified, a dish image obtained by shooting a meal in a relatively light environment (such as a cafeteria of an office and an outdoor space) has a different characteristic as a whole dish image from a characteristic of a dish image obtained by shooting a meal in a relatively dark environment (such as a home and an atmospheric restaurant). Accordingly, it is possible to determine, on the basis of the characteristics of the whole dish images, in which environment the dish image is shot. For example, even meals in the same place may be further reflected on characteristics of the whole dish images because luminous intensity is different owing to time zones.

In view of the above-described points, in the present embodiment, the dish recognition unit 130 compares a characteristic of a whole dish image with a characteristic of a source image from which the image of dish data is cut away, and selects dish data that is referred to, in accordance with the result. More specifically, the dish recognition unit 130 recognizes a dish included in a dish image by selectively referring to, as dish data, data of an image that is cut away from a source image having a characteristic similar to a characteristic of the whole dish image. The dish recognition process will be further described below with reference to specific examples of dish data.

FIG. 7 is a diagram illustrating an example of information associated with dish data in the second embodiment of the present disclosure. FIG. 7 illustrates pieces of dish data 2020a, 2020b, 2020p, and 2020q as examples of dish data 2020.

The dish data 2020 is recorded for each dish. The dish data 2020 is designated on the basis of a source image (Source), and an area (Area) that is cut away from the source image. That is, the dish data 2020 is data of an image that is cut away from the source image, and registered in association with information regarding the source image. For example, the pieces of dish data 2020a and 2020b are images obtained by cutting away different areas from the same source image (S001.jpg). Additionally, the source image is not limited to an image in the jpg format. An image size of the dish data 2020 is normalized as 20×20=400 (pixels), but another normalization method may also be used. Alternatively, the image size does not necessarily have to be normalized.

In the present embodiment, the data of the source image is stored in the database 140. The dish data 2020 is referred to by cutting away a designated area from the source image. As another example, an image of the dish data 2020 may be stored in the database 140 separately from the source image.

Figure 8:
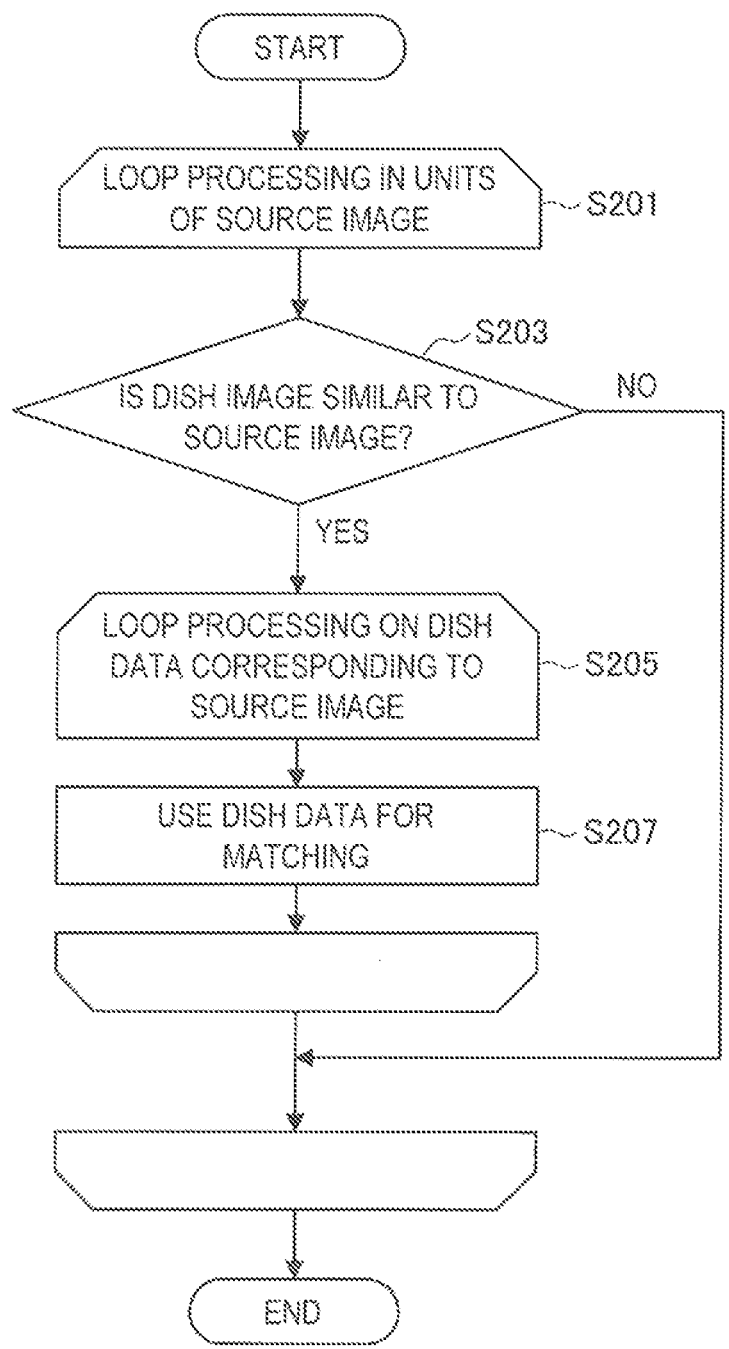
FIG. 8 is a flowchart illustrating an example of a dish recognition process in the second embodiment of the present disclosure.

FIG. 8 is a flowchart illustrating an example of a dish recognition process in the second embodiment of the present disclosure. In the illustrated example, the dish recognition unit 130 first performs loop processing in units of a source image of the dish data 2020 when recognizing a dish included in a dish image (step S201).

The dish recognition unit 130 determines, with respect to each source image, whether a dish image acquired by the image acquisition unit 110 is similar to the source image (step S203). It may be determined whether the dish image is similar to the source image, for example, on the basis of a characteristic such as average values of luminance and average values of colors of the respective images.

If the dish image is similar to the source image in step S203 (YES), the dish recognition unit 130 performs loop processing on the dish data 2020 corresponding to the source image, which is the dish data 2020 that is cut away from the source image (step S205). In loop processing, the dish recognition unit 130 uses the dish data 2020 for matching with the dish image (step S207). To the contrary, if the dish image is not similar to the source image (NO), the dish recognition unit 130 does not use the dish data 2020 corresponding to the source image for matching, and proceeds to process the next source image (step S201).

If strict similarity determination was performed on images in step S203, dish data corresponding to a source image that should not be actually excluded would be excluded from matching targets because even if a dish image and a source image are shot under the same shooting condition, the images both may have different dishes. Thus, for example, a low threshold value for similarity may be set in the similarity determination on images in step S203 such that only dish data that is cut away from a source image shot under a shooting condition clearly different from a shooting condition of the dish image is excluded from matching targets.

According to the configuration as described in the present embodiment, it is possible to maintain the accuracy of dish recognition without acquiring metadata of a dish image or associating various types of information with dish data, and decrease processing loads at the same time.

3. Third Embodiment

Figure 9:
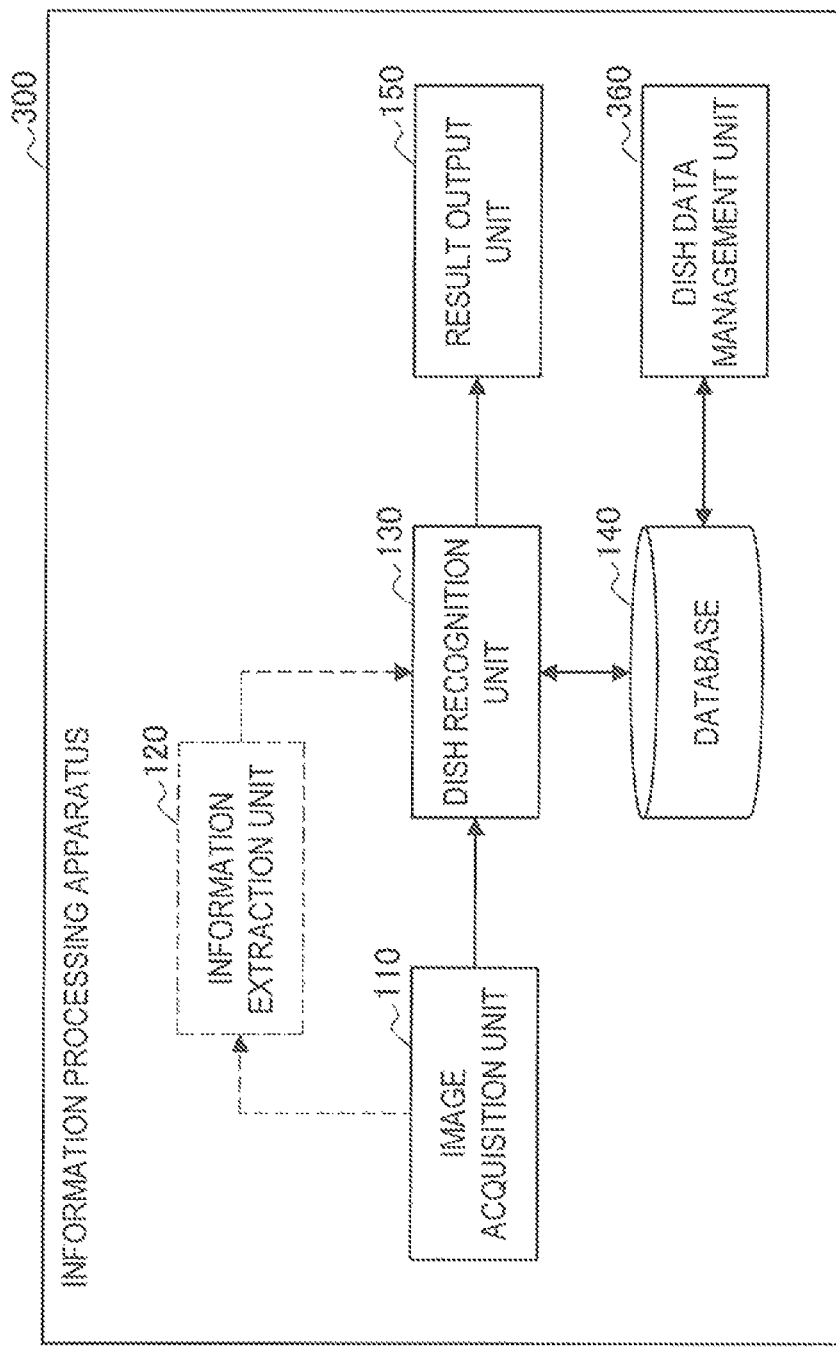
FIG. 9 is a block diagram illustrating a schematic functional configuration of an information processing apparatus according to a third embodiment of the present disclosure.

FIG. 9 is a block diagram illustrating a schematic functional configuration of an information processing apparatus according to a third embodiment of the present disclosure. With reference to FIG. 9, an information processing apparatus 300 includes an image acquisition unit 110, a dish recognition unit 130, a database 140, a result output unit 150, and a dish data management unit 360. The information processing apparatus 300 may further include an information extraction unit 120.

As shown in the figure, the information processing apparatus 300 may have the same configuration described in the first or second embodiment, except the information processing apparatus 300 has the dish data management unit 360 installed therein. Accordingly, a function of the dish data management unit 360 will be mainly described below, and the other repeated detailed description will be omitted.

The dish data management unit 360 registers dish data in an additional manner, and deletes a part of the dish data on the basis of a predetermined criterion if a predetermined volume of dish data are accumulated. The dish data management unit 360 is realized by a processor such as a CPU operating in accordance with a program stored in a memory.

As described above, for example, dish data may be registered in accordance with an input operation of a user, and may be distributed by a user who satisfies a predetermined condition. Then, the dish data management unit 360 registers new dish data with the database 140 in an additional manner. However, while dish data is registered in an additional manner, the volume of dish data used by the dish recognition unit 130 also unilaterally increases. Accordingly, processing loads in dish recognition also increases, though the dish data is selectively referred to under a predetermined condition. The dish data management unit 360 therefore registers dish data in an additional manner, and automatically deletes dish data on the basis of a predetermined criterion in the present embodiment.

FIG. 10 is a diagram illustrating an example of information that is associated with dish data in the third embodiment of the present disclosure. FIG. 10 illustrates pieces of dish data 3020$a$, 3020$b$, 3020$p$, and 3020$q$ as examples of dish data 3020.

The dish data 3020 is registered for each dish. Additionally, items that are used for the dish recognition unit 130 to select which dish data is referred to are not shown in the figure because the items are the same described in the first or second embodiment. The dish data 3020 is associated with a date when the dish data 3020 last matches (Last matched), the number of matching (Match count), a date when the dish data 3020 is last used (Last used), and a usage count (Usage count) in addition to the above-described items. For example, the dish data 3020$b$ is associated with information indicating that the dish data 3020$b$ last matches with a dish image on Aug. 20, 2012, the dish data 3020$b$ has matches with a dish image 18 times, the dish data 3020$b$ is last used for matching on Oct. 11, 2012, and the dish data 3020$b$ has been used for matching 130 times.

In the present embodiment, the dish data management unit 360 uses such kinds of information as indices to automatically delete the dish data 3020, and maintains the volume of dish data 3020 within an appropriate range. For example, the dish data management unit 360 first deletes data that has an older Last matched, which namely means that a longer time has passed since the data last matches with a dish image. If data is automatically deleted on basis of this criterion, the dish data 3020$b$ is the first to be deleted and the dish data 3020$p$ is subsequently deleted in the illustrated example.

For example, the dish data management unit 360 may also first delete data that has a smaller Match count, which namely means the data matches with a dish image fewer times. If data is automatically deleted on the basis of this criterion, the dish data 3020$q$ is the first to be deleted and the dish data 3020$b$ is subsequently deleted in the illustrated example. Similarly, the dish data management unit 360 may also first delete data that has an older Last used, or data that has a smaller Usage count.

In the illustrated example, if the dish data management unit 360 uses a Last matched or a Match count as a criterion for automatic deletion, data such as the dish data 3020$b$ that is frequently used for matching but less likely to match with a dish image is deleted. Meanwhile, if the dish data management unit 360 uses a Last used or a Match count as a criterion for automatic deletion, data such as the dish data 3020$q$ that is rarely used but more likely to match with a dish image when used is deleted.

Alternatively, the dish data management unit 360 may combine the above-described indices as a criterion for automatic deletion. For example, the dish data management unit 360 may calculate an evaluation value for automatic deletion of the dish data 3020 by weighting and adding the multiple indices. In that case, the dish data 3020 that has, for example, a lower evaluation value is the first to be deleted.

The dish data management unit 360 may also use the multiple indices like a decision tree for automatic deletion. In that case, the dish data management unit 360 first decides a deletion target on the basis of a first index, and further decides a deletion target on the basis of a different second index among the pieces of dish data 3020 that come under the same first index. For example, in the illustrated example, if two of four pieces of dish data 3020 are deleted, and if, for example, a Last used is set as a first index, the dish data 3020$q$ is decided as a deletion target. However, the remaining pieces of dish data 3020$a$, 3020$b$, and 3020$p$ come under the same index. Next, if, for example, a Usage count is used as a second index, the dish data 3020$p$ can be decided as a deletion target among the three pieces of dish data.

The indices used for automatic deletion of dish data are not limited to the above-described example. For example, dish data that periodically matches may be excluded from automatic deletion targets, as useful data regardless of an index as described above. Data for recognizing a dish such as a seasonal dish that is not frequently served but is served in most cases in a predetermined period can hereby be prevented from being deleted. Automatic deletion of the dish data 3020 performed by the dish data management unit 360 may be performed through an input operation of a user that manages the dish data 3020. For example, a user may protect specific dish data 3020 through an input operation, and be able to exclude the specific dish data 3020 from automatic deletion targets. To the contrary, a user may compulsorily delete the specific dish data 3020 through an input operation.

According to the configuration as described above in the present embodiment, it is possible to improve the accuracy of dish recognition by taking in new dish data, and prevent processing loads from increasing due to infinite increase of dish data.

4. Fourth Embodiment

Figure 11:
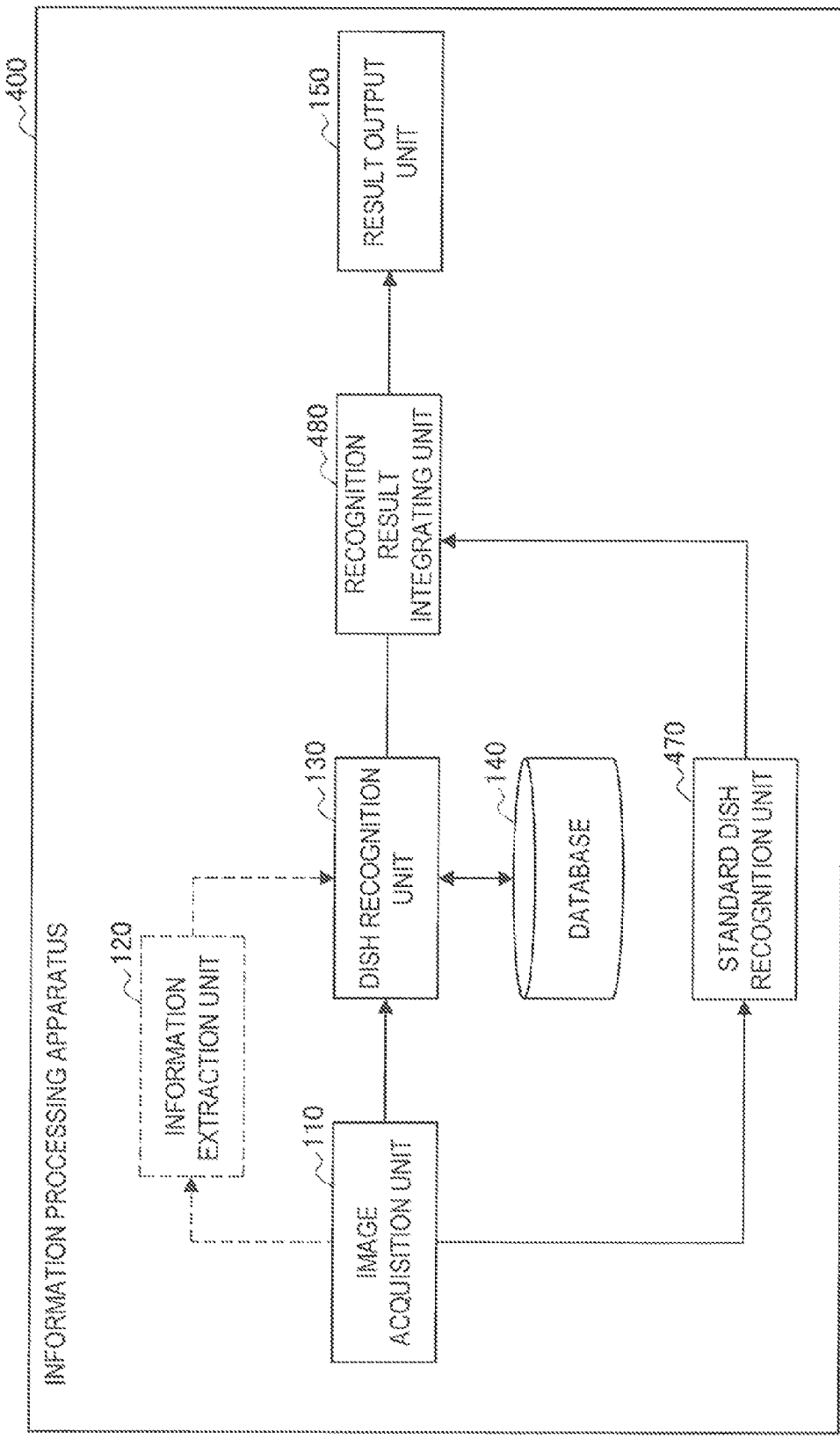
FIG. 11 is a block diagram illustrating a schematic functional configuration of an information processing apparatus according to a fourth embodiment of the present disclosure.

FIG. 11 is a block diagram illustrating a schematic functional configuration of an information processing apparatus according to a fourth embodiment of the present disclosure. With reference to FIG. 11, an information processing apparatus 400 includes an image acquisition unit 110, a dish recognition unit 130, a database 140, a result output unit 150, a standard dish recognition unit 470, and a recognition result integrating unit 480. The information processing apparatus 400 may further include an information extraction unit 120 or a dish data management unit 360.

As shown in the figure, the information processing apparatus 400 may have the same configuration described in the first to third embodiments, except the information processing apparatus 400 has the standard dish recognition unit 470 and the recognition result integrating unit 480 installed therein. Accordingly, functions of the standard dish recognition unit 470 and the recognition result integrating unit 480 will be mainly described below, and the other repeated detailed description will be omitted.

The standard dish recognition unit 470 recognizes a single or multiple dishes included in a dish image acquired by the image acquisition unit 110 without using a condition used for selecting dish data that is referred to when the dish recognition unit 130 performs a recognition process. A technique for a dish recognition process used by the standard dish recognition unit 470 is not particularly limited. For example, the standard dish recognition unit 470 may identify a dish area in a dish image through edge detection, and recognize a dish included in the area through learning-based object recognition. The standard dish recognition unit 470 is realized by a processor such as a CPU operating in accordance with a program stored in a memory.

A dish recognition process performed by the dish recognition unit 130 uses dish data associated with, for example, information indicating a situation in which a user shoots a dish image, and information indicating a situation in which a meal is taken, which namely means a personalized process for each user. Meanwhile, the standard dish recognition unit 470 uses common data for each user, and provides a more standard and generalized dish recognition process. Independent of a person relating to a dish image, a shooting environment of the dish image, a shooting place of the dish image, and a shooting time of the dish image, the standard dish recognition unit 470 performs dish recognition.

Thus, even if it is difficult for the dish recognition unit 130 to perform dish recognition, which namely means, for example, that no metadata is added to a dish image so that information is not acquired or that the database 140 does not store dish data which satisfies a condition indicated by information such as metadata (for example, when a user takes a meal in a restaurant that the user has not visited before), the standard dish recognition unit 470 may successfully perform dish recognition.

To the contrary, it is difficult for the standard dish recognition unit 470 to perform proper dish recognition on a dish image shot in a particular situation, which namely means, for example, that the dish image is shot under a very dimly lit lamp in an atmospheric restaurant or that a dish is served at home in a uniquely shaped bowl. It is also difficult to recognize, for example, a user original dish, whose data is not prepared in advance. Accordingly, for example, if necessary information is acquired from metadata of a dish image, and if the database 140 stores dish data that satisfies a condition indicated by the information (for example, a user takes the same dishes twice or more in the same place), the dish recognition unit 130 effectively performs dish recognition.

Both of the dish recognition unit 130 and the standard dish recognition unit 470 are therefore provided in the present embodiment, which allows the dish recognition unit 130 to accurately recognize a dish as taken by a user on a daily basis, and allows the standard dish recognition unit 470 to recognize even a dish that the user takes for the first time.

The recognition result integrating unit 480 integrates a recognition result obtained by the dish recognition unit 130 with a recognition result obtained by the standard dish recognition unit 470. If one of the dish recognition unit 130 and the standard dish recognition unit 470 succeeds in dish recognition, the recognition result integrating unit 480 provides the recognition result to the result output unit 150. If both of the dish recognition unit 130 and the standard dish recognition unit 470 succeed in dish recognition, the recognition result integrating unit 480 adopts the recognition result, for example, in accordance with priority that is set in advance, and provides the recognition result to the result output unit 150. Alternatively, for example, if each recognition unit calculates a score indicating the accuracy of the recognition result, the recognition result integrating unit 480 may adopt one of the recognition results that has a higher score. The recognition result integrating unit 480 is also realized by a processor such as a CPU operating in accordance with a program stored in a memory.

Furthermore, if both of the dish recognition unit 130 and the standard dish recognition unit 470 succeed in dish recognition, and if both of the recognition results are the same, the recognition result integrating unit 480 may negatively evaluate dish data that is recognized by the dish recognition unit 130 as matching with a dish image. This is because a dish recognized by using the dish data can also be recognized through dish recognition generalized by the standard dish recognition unit 470 so that the dish recognition unit 130 does not have to recognize the dish data. The negatively evaluated dish data becomes more likely to be deleted, for example, through automatic deletion performed by the dish data management unit 360.

5. Fifth Embodiment

Figure 12:
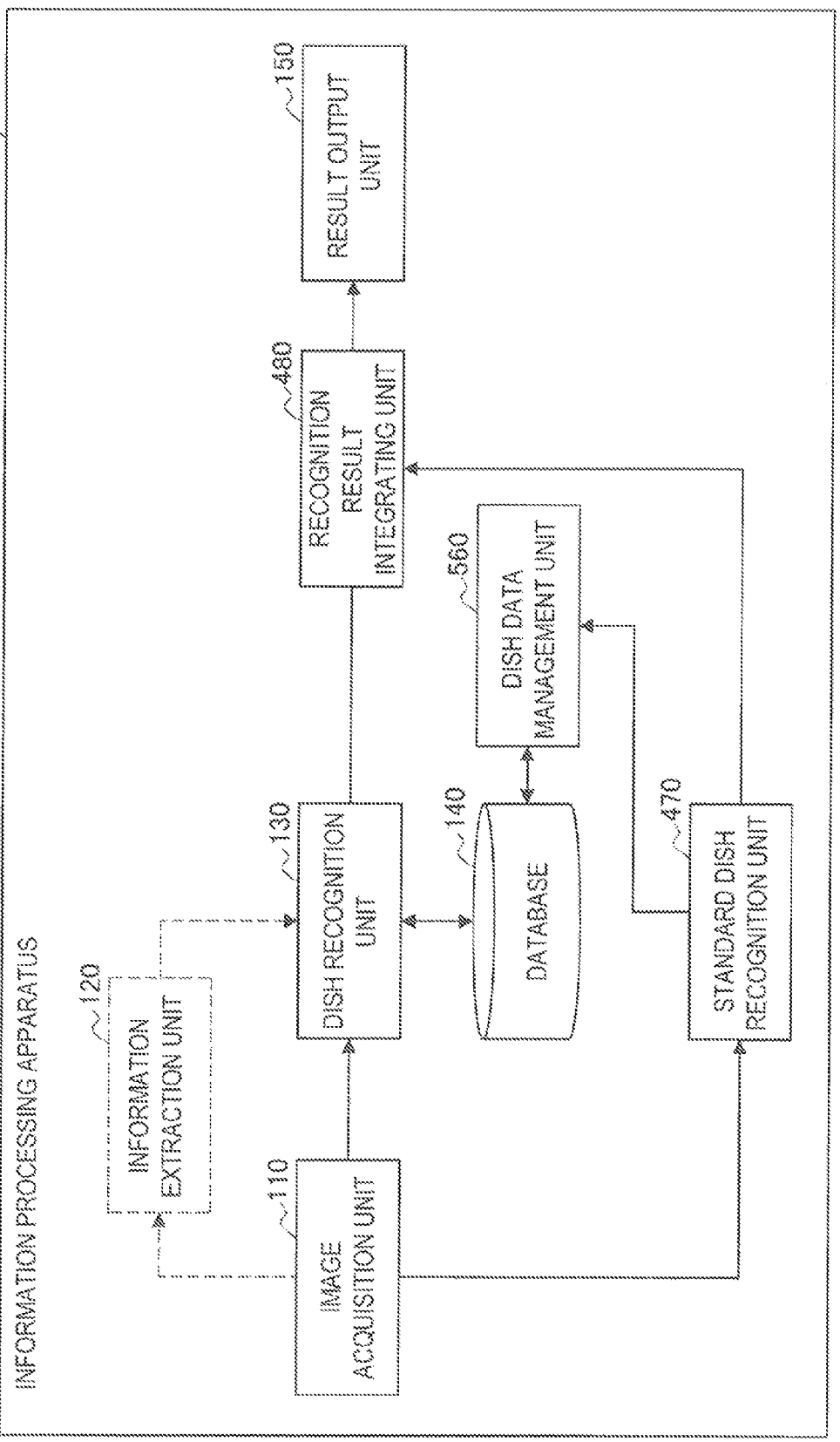
FIG. 12 is a block diagram illustrating a schematic functional configuration of an information processing apparatus according to a fifth embodiment of the present disclosure.

FIG. 12 is a block diagram illustrating a schematic functional configuration of an information processing apparatus according to a fifth embodiment of the present disclosure. With reference to FIG. 12, an information processing apparatus 500 includes an image acquisition unit 110, a dish recognition unit 130, a database 140, a result output unit 150, a standard dish recognition unit 470, a recognition result integrating unit 480, and a dish data management unit 560. The information processing apparatus 500 may further include an information extraction unit 120.

As shown in the figure, the information processing apparatus 500 may have the same configuration described in the fourth embodiment, except the information processing apparatus 500 has the dish data management unit 560 installed therein. Accordingly, a function of the dish data management unit 560 will be mainly described below, and the other repeated detailed description will be omitted.

The dish data management unit 560 registers dish data with the database 140 in an additional manner on the basis of a recognition result obtained by the standard dish recognition unit 470. In the present embodiment, if a dish included in a dish image is not automatically recognized, the recognition result is decided by the standard dish recognition unit 470 on the basis of an input of a user. In that case, the dish data management unit 560 registers data of the dish, which is not automatically recognized, as dish data in an additional manner. A result obtained by automatically recognizing a dish included in a dish image may be corrected by the standard dish recognition unit 470 on the basis of an input of a user. In that case, the dish data management unit 560 registers the data of the dish having the recognition result, which is decided through correction, as dish data in an additional manner. The dish data management unit 560 is realized by a processor such as a CPU operating in accordance with a program stored in a memory.

Figure 13:
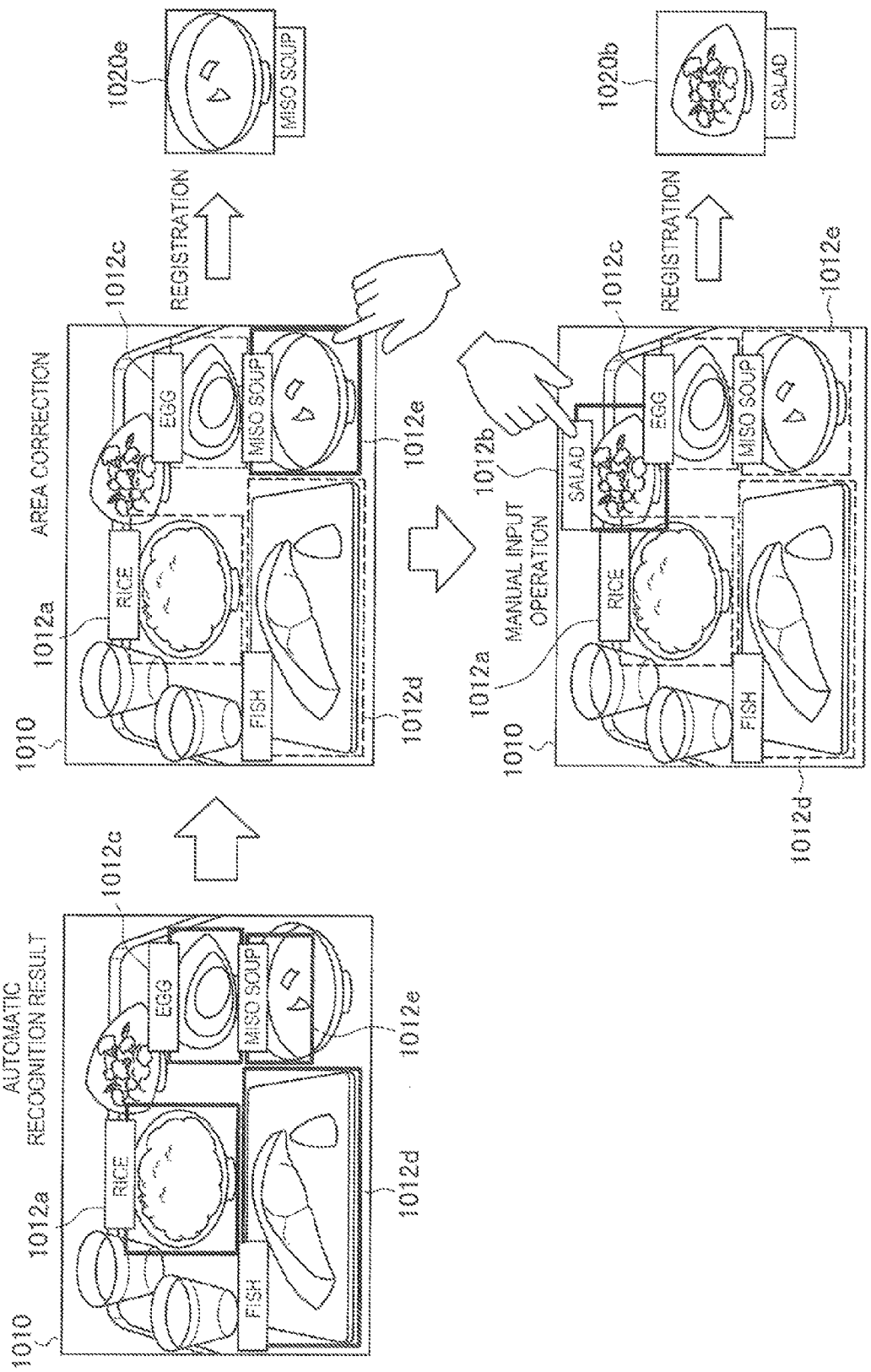
FIG. 13 is a diagram for describing an example of additional registration of dish data in the fifth embodiment of the present disclosure.

FIG. 13 is a diagram for describing an example of additional registration of dish data in the fifth embodiment of the present disclosure. FIG. 13 illustrates an example of an automatic recognition result obtained by the standard dish recognition unit 470. The result indicates that the rice 1012a, the egg 1012c, the fish 1012d, and the miso soup 1012e are recognized as the dishes 1012 included in the dish image 1010, but the salad 1012b is not recognized. Although the miso soup 1012e is certainly recognized, it is determined that the miso soup has a smaller dish area than the actual area for the miso soup.

Accordingly, a user corrects the recognized area, and manually inputs the recognition result. For example, such an input is acquired when a recognition result obtained by the standard dish recognition unit 470 is provided to the user via the recognition result integrating unit 480 and the result output unit 150, and the user makes correction and performs a manual input operation. The figure illustrates the example in which a user uses a touch panel and the like to designate a position on an image, and designates an area for the displayed dish image 1010. However, the example of the user input is not limited thereto. Various input devices may be used for performing an input operation.

In the illustrated example, first, a user corrects the recognized area for the miso soup 1012e. The area for the miso soup 1012e indicated by the recognition result hereby matches with the area in which the actual miso soup bowl is shown. Then, the dish data management unit 560 registers the dish data corresponding to the corrected miso soup 1012e with the database 140 in an additional manner. This is because it is more appropriate to use the dish data registered this time by the dish recognition unit 130 in order to recognize the miso soup 1012e included in the dish image next time or later since the standard dish recognition unit 470 fails to correctly recognize the area for the miso soup 1012e.

Next, the user performs a manual input operation to cause the salad 1012b, which fails to be recognized, to be recognized. For example, the user designates the area for the salad 1012b in the dish image 1010, and inputs a dish name, "salad," for the designated area. The dish data management unit 560 registers the dish data corresponding to the salad 1012b with the database 140 in an additional manner. This is because it is more appropriate to use the dish data registered this time by the dish recognition unit 130 in order to recognize the salad 1012b included in the dish image next time or later since the standard dish recognition unit 470 fails to recognize the salad 1012b.

Additionally, the dish data management unit 560, which registers the dish data with the database 140 in an additional manner, may automatically delete dish data on basis of a predetermined criterion in the same way as the dish data management unit 360 described in the third embodiment in order to prevent indefinite increase of dish data.

According to the configuration as described above in the present embodiment, if a user does not explicitly perform a registration process on dish data, the dish data management unit 560 automatically registers, with the database 140, dish data regarding a dish that the standard dish recognition unit 470 fails to correctly and automatically recognize. Thus, dishes that are recognized by the dish recognition unit 130 by use of the dish data stored in the database 140 can be limited to dishes that are difficult for the standard dish recognition unit 470 to recognize. Consequently, only a minimum volume of dish data are stored in the database 140, which decreases processing loads in dish recognition performed by the dish recognition unit 130.

6. Sixth Embodiment

Figure 14:
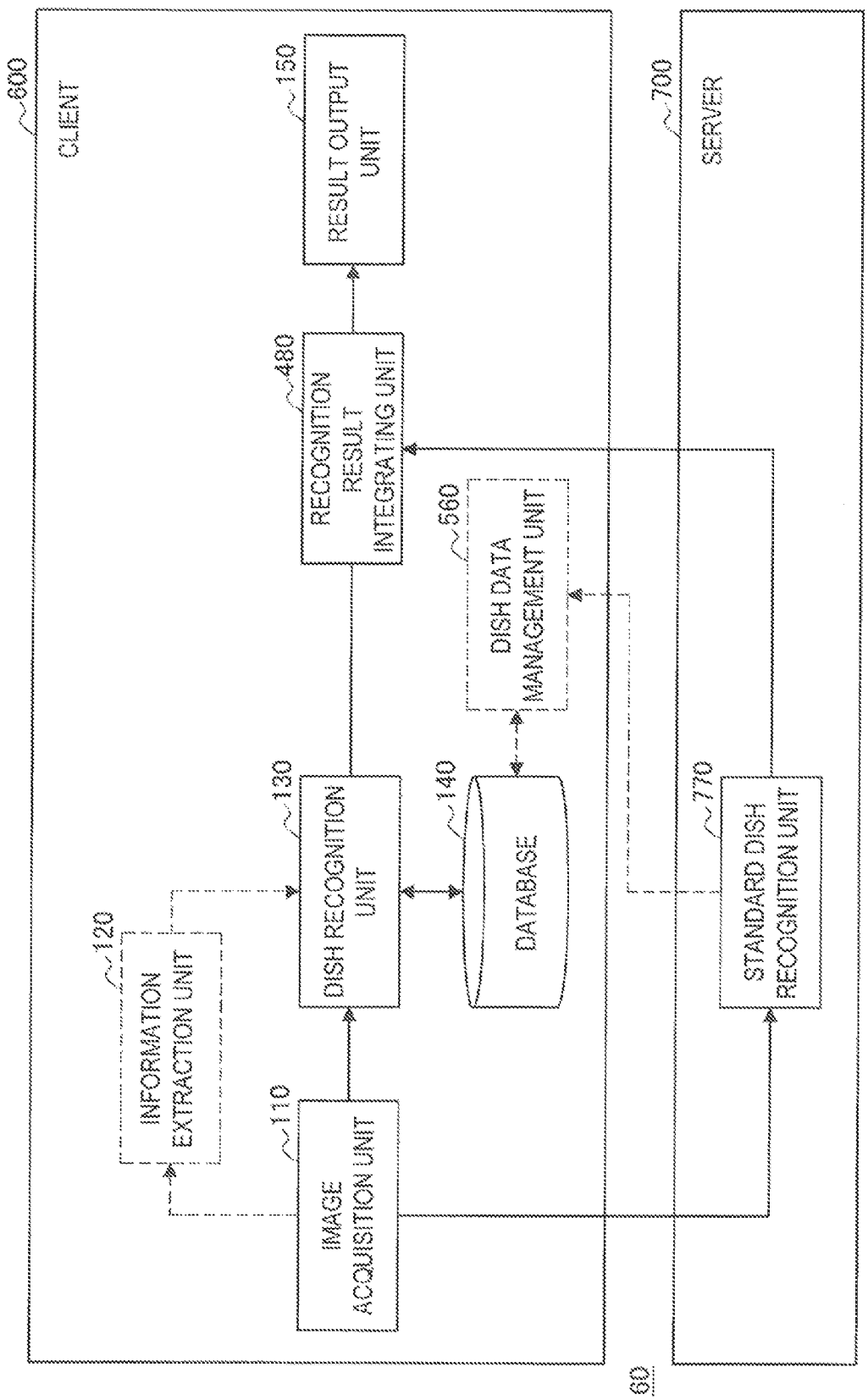
FIG. 14 is a block diagram illustrating a schematic functional configuration of a system according to a sixth embodiment of the present disclosure.

FIG. 14 is a block diagram illustrating a schematic functional configuration of a system according to a sixth embodiment of the present disclosure. With reference to FIG. 14, a system 60 includes a client 600 and a server 700. The client 600 includes an image acquisition unit 110, a dish recognition unit 130, a database 140, a result output unit 150, and a recognition result integrating unit 480. The client 600 may further include an information extraction unit 120 or a dish data management unit 560. The server 700 includes a standard dish recognition unit 770.

The present embodiment is different from the fourth or fifth embodiment in that the same functional configuration described in the fourth or fifth embodiment is distributed and realized in the client 600 and the server 700. For example, the client 600 is realized by a terminal apparatus used by a user. The server 700 is realized by a single or multiple server apparatuses that communicate with the terminal apparatus, which is the client 600, to provide a service to the user. Since the other parts of the configuration according to the present embodiment are substantially the same described in the fourth or fifth embodiment, the repeated detailed description will be omitted.

The standard dish recognition unit 770 of the server 700 receives a dish image from the image acquisition unit 110 of the client 600, and performs the same standardized process of dish recognition performed by the standard dish recognition unit 470 described in the fourth or fifth embodiment. The standard dish recognition unit 770 transmits the recognition result to the recognition result integrating unit 480 of the client 600. That is, in the present embodiment, the client 600 asks the server 700 to perform the standardized process of dish recognition performed by the standard dish recognition unit 770.

The information processing apparatuses 400 and 500 according to the fourth and fifth embodiments may also be terminal apparatuses (clients) and servers. That is, in both of the embodiments, a dish recognition process performed by the dish recognition unit 130 and a dish recognition process performed by the standard dish recognition unit 470 are performed together in clients or servers. However, as described above, a process of dish recognition places heavy processing loads. Accordingly, it may not be practical that the dish recognition processes are performed together in clients that have relatively low processing capacity. Thus, it is preferable in view of processing load adjustment that the dish recognition processes are performed together in servers that have high processing capacity.

However, for example, as illustrated in the example of FIG. 3B, dish data may include personal information of a user. Thus, it may not be preferable to store dish data in a server. Accordingly, in the present embodiment, privacy of a user is protected by disposing the database 140, which stores dish data, and the dish recognition unit 130, which performs a dish recognition process by using the dish data, in the client 600, while processing loads are decreased on the client 600 by causing the standard dish recognition unit 770 disposed in the server 700 to perform a standardized dish recognition process, which uses general data.

7. Hardware Configuration

Figure 15:
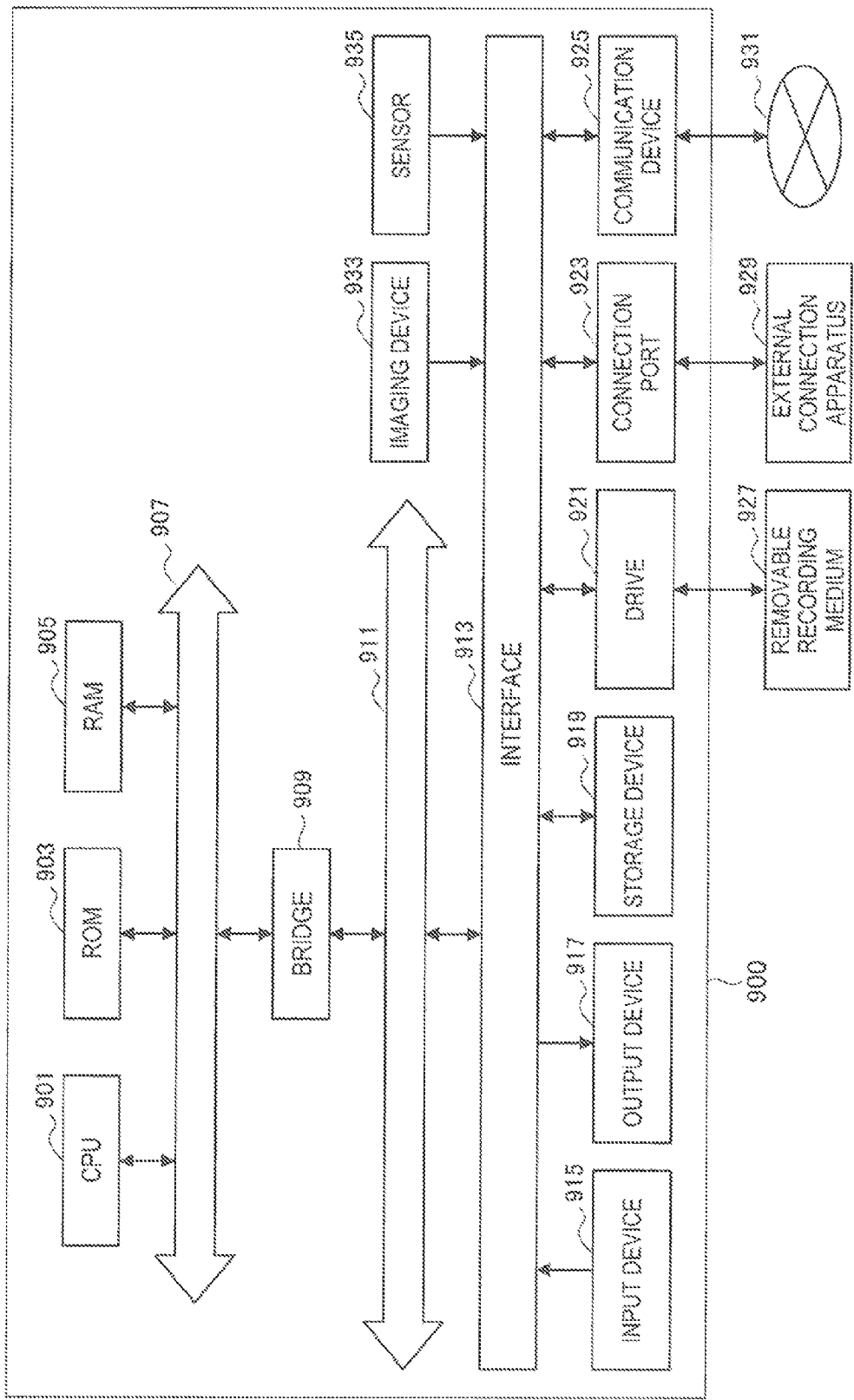
FIG. 15 is a block diagram for describing a hardware configuration of an information processing apparatus.

Next, with reference to FIG. 15, a hardware configuration of an information processing apparatus according to an embodiment of the present disclosure will be described. FIG. 15 is a block diagram for describing a hardware configuration of an information processing apparatus. An illustrated information processing apparatus 900 may realize, for example, the information processing apparatuses 100 to 500, the client 600, and the server 700 in the above-described embodiments.

The information processing apparatus 900 includes a central processing unit (CPU) 901, read only memory (ROM) 903, and random access memory (RAM) 905. The information processing apparatus 900 may include a host bus 907, a bridge 909, an external bus 911, an interface 913, an input device 915, an output device 917, a storage device 919, a drive 921, a connection port 923, and a communication device 925. The information processing apparatus 900 may further include an imaging device 933 and a sensor 935 as necessary. The information processing apparatus 900 may include a processing circuit such as a digital signal processor (DSP) instead of or along with the CPU 901.

The CPU 901 functions as an arithmetic processing device and a control device, and controls all or a part of operations in the information processing apparatus 900 in accordance with various programs recorded on the ROM 903, the RAM 905, the storage device 919, or a removable recording medium 927. The ROM 903 stores, for example, a program and an operation parameter used by the CPU 901. The RAM 905 temporarily stores, for example, a program used when the CPU 901 operates, and a parameter varying as necessary white the CPU 901 is operating. The CPU 901, the ROM 903, and the RAM 905 are connected to each other by the host bus 907 including an internal bus such as a CPU bus. Furthermore, the host bus 907 is connected to the external bus 911 such as a peripheral component interconnect/interface (PCI) bus via the bridge 909.

The input device 915 is a device operated by a user such as a mouse, a keyboard, a touch panel, a button, a switch, and a lever. The input device 915 may be a remote control device that uses, for example, infrared radiation and another type of radiowaves. Alternatively, the input device 915 may be an external connection apparatus 929 such as a mobile phone that corresponds to an operation of the information processing apparatus 900. The input device 915 includes an input control circuit that generates input signals on the basis of information which is input by a user to output the generated input signals to the CPU 901. A user inputs various types of data and indicates a processing operation to the information processing apparatus 900 by operating the input device 915.

The output device 917 includes a device that can visually or audibly report acquired information to a user. The output device 917 may be, for example, a display device such as a liquid crystal display (LCD), a plasma display panel (PDP), and an organic electro-luminescence (EL) display, an audio output device such as a speaker and a headphone, and a printer. The output device 917 outputs a result obtained through a process performed by the information processing apparatus 900, in the form of video such as text and an image, or sounds such as voice and audio sounds.

The storage device 919 is a device for data storage that is an example of a storage unit of the information processing apparatus 900. The storage device 919 includes, for example, a magnetic storage device such as a hard disk drive (HDD), a semiconductor storage device, an optical storage device, or a magneto-optical storage device. The storage device 919 stores a program and various types of data executed by the CPU 901, various types of data acquired from an external apparatus, and the like.

The drive 921 is a reader/writer for the removable recording medium 927 such as a magnetic disk, an optical disc, a magneto-optical disk, and a semiconductor memory, and built in or externally attached to the information processing apparatus 900. The drive 921 reads out information recorded on the mounted removable recording medium 927, and outputs the information to the RAM 905. The drive 921 writes the record into the mounted removable recording medium 927.

The connection port 923 is a port for directly connecting a device to the information processing apparatus 900. The connection port 923 may be, for example, a universal serial bus (USB) port, an IEEE1394 port, and a small computer system interface (SCSI) port. The connection port 923 may also be, for example, an RS-232C port, an optical audio terminal, and a high-definition multimedia interface (HDMI) port. Various types of data may be exchanged between the information processing apparatus 900 and the external connection apparatus 929 by connecting the external connection apparatus 929 to the connection port 923.

The communication device 925 is a communication interface including, for example, a communication device for connection to a communication network 931. The communication device 925 may be, for example, a wired or wireless local area network (LAN), Bluetooth (registered trademark), or a communication card for a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transits signals to and receives signals from another communication device by using a predetermined protocol such as TCP/IP. The communication network 931 to which the communication device 925 connects is a network established through wired or wireless connection. The communication network 931 is, for example, the Internet, a home LAN, infrared communication, radio communication, or satellite communication.

The imaging device 933 is a device that shoots a real space by using an image sensor such as a charge coupled device (CCD) and a complementary metal oxide semiconductor (CMOS), and various members such as a lens for controlling image formation of a subject image onto the image sensor, and generates the shot image. The imaging device 933 may shoot a still image or a moving image.

The sensor 935 is various sensors such as an acceleration sensor, a gyro sensor, a geomagnetic sensor, an optical sensor, and a sound sensor. The sensor 935 acquires information regarding a state of the information processing apparatus 900 such as a posture of a housing of the information processing apparatus 900, and information regarding an environment surrounding the information processing apparatus 900 such as luminous intensity and noise around the information processing apparatus 900. The sensor 935 may include a global positioning system (GPS) sensor that receives GPS signals to measure latitude, longitude, and altitude of the apparatus.

As above, the example of the hardware configuration of the information processing apparatus 900 has been described. A general-purpose member may be used for each structural element, or hardware dedicated to a function of each structural element may also be used. The configuration may be changed as necessary in accordance with the state of the art at the time of working of the present disclosure.

8. Supplement

The embodiments of the present disclosure may include, for example, the information processing apparatus, the system, the information processing method executed by the information processing apparatus or the system, the program for causing the information processing apparatus to function, and the recording medium having the program recorded thereon.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including:
 an image acquisition unit configured to acquire a dish image obtained by shooting a single or multiple dishes; and
 a first dish recognition unit configured to recognize the single or multiple dishes included in the dish image with reference to dish data selected, from dish data registered in advance, based on a condition regarding at least one of a person relating to the dish image, a shooting environment of the dish image, a shooting place of the dish image, and a shooting time of the dish image.

(2) The information processing apparatus according to (1), further including:
 a recognition result integrating unit configured to integrate a first recognition result obtained by the first dish recognition unit with a second recognition result obtained by a second dish recognition unit, the second dish recognition unit recognizing the single or multiple dishes included in the dish image without using the condition.

(3) The information processing apparatus according to (2), further including:
 a dish data management unit configured to register the dish data in an additional manner based on the second recognition result.

(4) The information processing apparatus according to (3),
 wherein, when the single or multiple dishes are not automatically recognized, the second recognition result is decided based on an input of a user, and
 wherein the dish data management unit registers the dish data in an additional manner based on the second recognition result decided based on the input of the user.

(5) The information processing apparatus according to (3) or (4),
 wherein, the second recognition result is a result obtained by automatically recognizing the single or multiple dishes or a result obtained by correcting the result based on information that is input by a user, and
 wherein the dish data management unit registers the dish data in an additional manner based on the second recognition result decided through correction based on the information that is input by the user.

(6) The information processing apparatus according to any one of (2) to (5),
 wherein the information processing apparatus is a client used by a user who shoots the dish image,
 wherein the image acquisition unit transmits the acquired dish image to a server that includes the second dish recognition unit, and
 wherein the recognition result integrating unit receives the second recognition result from the server.

(7) The information processing apparatus according to any one of (1) to (6), further including:
 a dish data management unit configured to register the dish data in an additional manner, and to delete a part of the dish data based on a predetermined criterion when a predetermined volume of the dish data are accumulated.

(8) The information processing apparatus according to (7),
 wherein the first dish recognition unit recognizes the single or multiple dishes by matching the dish image with the selected dish data.

(9) The information processing apparatus according to (8),
 wherein the dish data management unit deletes a part of the dish data based on a number indicating how many times the dish data is used for matching with the dish image, or a date and time indicating when the dish data is used for matching with the dish image.

(10) The information processing apparatus according (8) or (9),
 wherein the dish data management unit deletes a part of the dish data based on a number indicating how many times the dish data successfully matches with the dish image, or a date and time indicating when the dish data successfully matches the dish image.

(11) The information processing apparatus according to any one of (1) to (10),
 wherein the image acquisition unit acquires the dish image that entails metadata, and
 wherein the information processing apparatus further includes:
  an information extraction unit configured to extract the information regarding at least one of the person relating to the dish image, the shooting environment of the dish image, the shooting place of the dish image, and the shooting time of the dish image from the metadata.

(12) The information processing apparatus according to (11),
 wherein the information extraction unit extracts information regarding the person relating to the dish image, and
 wherein the first dish recognition unit recognizes the single or multiple dishes with reference to the dish data registered in association with the person.

(13) The information processing apparatus according to (11) or (12),
 wherein the information extraction unit extracts information regarding the shooting environment of the dish image, and
 wherein the first dish recognition unit recognizes the single or multiple dishes by using the dish data registered in association with information indicating an environment common to the shooting environment.

(14) The information processing apparatus according to any one of (11) to (13),
 wherein the information extraction unit extracts information regarding the shooting place of the dish image, and
 wherein the first dish recognition unit recognizes the single or multiple dishes by using the dish data registered in association with the shooting place.

(15) The information processing apparatus according to any one of (11) to (14),
 wherein the information extraction unit extracts information regarding the shooting time of the dish image, and
 wherein the first dish recognition unit recognizes the single or multiple dishes by using the dish data registered in association with a time zone including the shooting time.

(16) The information processing apparatus according to any one of (1) to (10),
 wherein the first dish recognition unit treats a characteristic of a whole of the dish image as information regarding at least one of the shooting environment of the dish image, the shooting place of the dish image, and the shooting time of the dish image.

(17) The information processing apparatus according to (16),
 wherein the dish data is data of an image that is cut away from a source image, and is registered in association with information regarding the source image, and wherein, when the characteristic of the whole of the dish image is similar to a characteristic of the source image, the first dish recognition unit recognizes the single or multiple dishes by using the data of the image that is cut away from the source image.

(18) An information processing apparatus including:
acquiring a dish image obtained by shooting a single or multiple dishes; and
recognizing the single or multiple dishes included in the dish image with reference to dish data selected, from dish data registered in advance, based on a condition regarding at least one of a person relating to the dish image, a shooting environment of the dish image, a shooting place of the dish image, and a shooting time of the dish image.

What is claimed is:

1. An information processing apparatus comprising:
circuitry configured to
acquire a dish image obtained by shooting a single or multiple dishes; and
recognize the single or multiple dishes included in the dish image with reference to dish data selected, from dish data registered in advance, based on a condition regarding at least one of a person relating to the dish image, a shooting environment of the dish image, a shooting place of the dish image, and a shooting time of the dish image,
wherein the shooting the single or multiple dishes is performed using a camera.

2. The information processing apparatus according to claim 1, wherein the circuitry is further configured to
integrate a first recognition result, obtained based on the recognition of the single or multiple dishes, with a second recognition result obtained by another recognition of the single or multiple dishes included in the dish image without using the condition.

3. The information processing apparatus according to claim 2, wherein the circuitry is further configured to
register the dish data in an additional manner based on the second recognition result.

4. The information processing apparatus according to claim 3,
wherein, when the single or multiple dishes are not automatically recognized, the second recognition result is decided based on an input of a user, and
wherein the dish data is registered in an additional manner based on the second recognition result decided based on the input of the user.

5. The information processing apparatus according to claim 3,
wherein, the second recognition result is a result obtained by automatically recognizing the single or multiple dishes or a result obtained by correcting the result based on information that is input by a user, and
wherein the dish data is registered in an additional manner based on the second recognition result decided through correction based on the information that is input by the user.

6. The information processing apparatus according to claim 2,
wherein the information processing apparatus is a client used by a user who shoots the dish image,
wherein the acquired dish image is transmitted to a server that includes the second dish recognition unit, and
wherein the second recognition result is received from the server.

7. The information processing apparatus according to claim 1, wherein the circuitry is further configured to
register the dish data in an additional manner, and
delete a part of the dish data based on a predetermined criterion when a predetermined volume of the dish data are accumulated.

8. The information processing apparatus according to claim 7,
wherein the single or multiple dishes are recognized by matching the dish image with the selected dish data.

9. The information processing apparatus according to claim 8,
wherein a part of the dish data is deleted based on a number indicating how many times the dish data is used for matching with the dish image, or a date and time indicating when the dish data is used for matching with the dish image.

10. The information processing apparatus according claim 8,
wherein a part of the dish data is deleted based on a number indicating how many times the dish data successfully matches with the dish image, or a date and time indicating when the dish data successfully matches the dish image.

11. The information processing apparatus according to claim 1,
wherein the dish image is acquired that entails metadata, and
wherein the circuitry is further configured to
extract the information regarding at least one of the person relating to the dish image, the shooting environment of the dish image, the shooting place of the dish image, and the shooting time of the dish image from the metadata.

12. The information processing apparatus according to claim 11,
wherein information regarding the person relating to the dish image is extracted, and
wherein the single or multiple dishes are recognized with reference to the dish data registered in association with the person.

13. The information processing apparatus according to claim 11,
wherein information regarding the shooting environment of the dish image is extracted, and
wherein the single or multiple dishes are recognized by using the dish data registered in association with information indicating an environment common to the shooting environment.

14. The information processing apparatus according to claim 11,
wherein information regarding the shooting place of the dish image is extracted, and
wherein single or multiple dishes are recognized by using the dish data registered in association with the shooting place.

15. The information processing apparatus according to claim 11,
wherein information regarding the shooting time of the dish image is extracted, and
wherein the single or multiple dishes are recognized by using the dish data registered in association with a time zone including the shooting time.

16. The information processing apparatus according to claim 1,
wherein a characteristic of a whole of the dish image is treated as information regarding at least one of the shooting environment of the dish image, the shooting place of the dish image, and the shooting time of the dish image.

17. The information processing apparatus according to claim 16,
wherein the dish data is data of an image that is cut away from a source image, and is registered in association with information regarding the source image, and
wherein, when the characteristic of the whole of the dish image is similar to a characteristic of the source image, the single or multiple dishes are recognized by using the data of the image that is cut away from the source image.

18. The information processing apparatus according to claim 1, wherein the circuitry is further configured to recognize a respective dish area corresponding to each of the dishes included in the dish image.

19. An information processing method executed via an information processing apparatus, the method comprising:
acquiring a dish image obtained by shooting a single or multiple dishes; and
recognizing the single or multiple dishes included in the dish image with reference to dish data selected, from dish data registered in advance, based on a condition regarding at least one of a person relating to the dish image, a shooting environment of the dish image, a shooting place of the dish image, and a shooting time of the dish image,
wherein the shooting the single or multiple dishes is performed using a camera.

20. A non-transitory computer-readable medium having embodied thereon a program, which when executed by a computer causes the computer to execute a method, the method comprising:
acquiring a dish image obtained by shooting a single or multiple dishes; and
recognizing the single or multiple dishes included in the dish image with reference to dish data selected, from dish data registered in advance, based on a condition regarding at least one of a person relating to the dish image, a shooting environment of the dish image, a shooting place of the dish image, and a shooting time of the dish image,
wherein the shooting the single or multiple dishes is performed using a camera.

* * * * *